United States Patent
Vollmer et al.

[11] Patent Number: 6,100,222
[45] Date of Patent: Aug. 8, 2000

[54] HIGH DENSITY, VISCOSIFIED, AQUEOUS COMPOSITIONS HAVING SUPERIOR STABILITY UNDER STRESS CONDITIONS

[75] Inventors: Daniel P. Vollmer; Paul H. Javora; Robert L. Horton, all of Lafayette, La.

[73] Assignee: Great Lakes Chemical Corporation, West Lafayette, Ind.

[21] Appl. No.: 08/783,459

[22] Filed: Jan. 16, 1997

Related U.S. Application Data

[60] Provisional application No. 60/010,051, Jan. 16, 1996.

[51] Int. Cl.$^7$ ........................................................ C09K 7/02
[52] U.S. Cl. ............................ 507/113; 507/114; 507/103
[58] Field of Search ........................... 507/113, 114, 507/103

[56] References Cited

U.S. PATENT DOCUMENTS

| | | | |
|---|---|---|---|
| 3,485,651 | 12/1969 | Ganz | 106/179 |
| 3,878,110 | 4/1975 | Miller et al. | 507/111 |
| 3,899,439 | 8/1975 | Mahlman | 252/311 |
| 3,953,335 | 4/1976 | Jackson | 252/8.5 |
| 3,955,998 | 5/1976 | Clampitt et al. | 106/193 |
| 3,960,736 | 6/1976 | Free et al. | 507/216 |
| 4,046,197 | 9/1977 | Gruesbeck, Jr. et al. | 166/305.1 |
| 4,071,457 | 1/1978 | Meister | 252/8.55 |
| 4,172,801 | 10/1979 | Jackson | 507/108 |
| 4,175,042 | 11/1979 | Mondshine et al. | 507/113 |
| 4,247,402 | 1/1981 | Hartfiel | 507/110 |
| 4,304,677 | 12/1981 | Stauffer et al. | 252/8.55 R |
| 4,312,675 | 1/1982 | Pickens et al. | 106/171 |

(List continued on next page.)

FOREIGN PATENT DOCUMENTS

| | | |
|---|---|---|
| 0 259 939 A2 | 3/1988 | European Pat. Off. . |
| 0 505 169 A1 | 9/1992 | European Pat. Off. . |
| 0 572 113 A1 | 12/1993 | European Pat. Off. . |
| 0 672 740 A1 | 9/1995 | European Pat. Off. . |
| 2 104 575 A | 3/1983 | United Kingdom . |
| WO 93/16144 | 8/1993 | WIPO . |
| WO 94/09253 | 4/1994 | WIPO . |
| WO 95/21900 | 8/1995 | WIPO . |
| WO 95/24452 | 9/1995 | WIPO . |

*Primary Examiner*—C. H. Kelly
*Attorney, Agent, or Firm*—Woodard, Emhardt, Naughton, Moriarty & McNett

[57] ABSTRACT

Advantageous aqueous mixed salt systems viscosified with water-soluble or water-dispersable polymers which are superior to corresponding single salt systems of similar densities are provided. The mixed salt systems comprise water; a water-soluble or water-dispersable polymer capable of viscosifying an aqueous medium; one or more cations including a member selected from the group consisting of lithium, sodium, potassium, cesium, magnesium, calcium, zinc, or mixtures thereof; and one or more anions including a member selected from the group consisting of chloride, bromide, iodide, formate, nitrate, acetate, cyanate, thiocyanate, a zinc complex anion or mixtures thereof; there being present either at least two cations or at least two anions. Inventive viscosified mixed salt systems display—under such stressing factors as aging, heat, mechanical agitation, and shear—greater stability compared to the single salt systems of similar densities. Also provided are methods for making viscosified mixed salt systems and methods for advantageously using the same as drilling, drill-in, completion, hydraulic fracturing, work-over, packer, well treating, testing, spacer, or hole abandonment fluids.

35 Claims, 11 Drawing Sheets

U.S. PATENT DOCUMENTS

| | | | |
|---|---|---|---|
| 4,325,861 | 4/1982 | Braun et al. | 532/205 |
| 4,330,414 | 5/1982 | Hoover | 252/8.5 |
| 4,357,260 | 11/1982 | Sanford et al. | 252/363.5 |
| 4,369,843 | 1/1983 | Mondshine | 166/292 |
| 4,422,947 | 12/1983 | Dorsey et al. | 507/111 |
| 4,425,241 | 1/1984 | Swanson | 252/8.5 |
| 4,453,979 | 6/1984 | DeMasi et al. | 106/188 |
| 4,486,317 | 12/1984 | Sandell | 252/8.5 A |
| 4,513,818 | 4/1985 | Michels | 166/244 |
| 4,582,614 | 4/1986 | House et al. | 252/8.5 |
| 4,599,180 | 7/1986 | Vio et al. | 252/8.55 |
| 4,600,515 | 7/1986 | Gleason et al. | 252/8.5 |
| 4,609,476 | 9/1986 | Heilweil | 252/8.55 |
| 4,615,740 | 10/1986 | Pelezo et al. | 106/177 |
| 4,619,773 | 10/1986 | Heilweil et al. | 252/8.514 |
| 4,621,692 | 11/1986 | Mondshine | 166/281 |
| 4,646,834 | 3/1987 | Bannister | 166/291 |
| 4,743,384 | 5/1988 | Lu et al. | 252/8.514 |
| 4,799,962 | 1/1989 | Ahmed | 106/188 |
| 4,822,500 | 4/1989 | Dobson, Jr. et al. | 252/8.551 |
| 4,836,941 | 6/1989 | Thomas | 252/8.555 |
| 4,883,537 | 11/1989 | Burdick | 106/194 |
| 4,900,457 | 2/1990 | Clarke-Sturman et al. | 252/8.514 |
| 4,941,982 | 7/1990 | Dadgar et al. | 252/8.551 |
| 5,028,263 | 7/1991 | Burdick | 106/194 |
| 5,099,930 | 3/1992 | Enright et al. | 175/65 |
| 5,112,965 | 5/1992 | Fujishige et al. | 536/114 |
| 5,120,708 | 6/1992 | Melear et al. | 507/126 |
| 5,228,909 | 7/1993 | Burdick et al. | 106/194 |
| 5,246,490 | 9/1993 | Kehoe et al. | 106/189 |
| 5,260,269 | 11/1993 | Hale et al. | 507/136 |
| 5,362,312 | 11/1994 | Skaggs et al. | 106/189 |
| 5,415,228 | 5/1995 | Price et al. | 166/278 |
| 5,480,863 | 1/1996 | Oakley et al. | 507/225 |
| 5,504,062 | 4/1996 | Johnson | 507/212 |
| 5,514,644 | 5/1996 | Dobson | 507/111 |
| 5,559,082 | 9/1996 | Sanner et al. | 507/273 |
| 5,576,271 | 11/1996 | Patel | 507/110 |
| 5,612,293 | 3/1997 | Swartwout | 507/110 |

HIGH DENSITY, VISCOSIFIED, AQUEOUS COMPOSITIONS HAVING SUPERIOR STABILITY UNDER STRESS CONDITIONS

REFERENCE TO RELATED APPLICATIONS

This application claims priority upon U.S. patent application Ser. No. 60/010,051 filed Jan. 16, 1996, which is hereby incorporated by reference in its entirety.

BACKGROUND OF THE INVENTION

1. Field of the Invention

The present invention relates generally to the exploitation of subterranean formations. More specifically, it relates to the exploitation of subterranean petroliferous formations using high density mixed-brine-based fluids such as drilling, drill-in, completion, hydraulic fracturing, work-over, packer, well treating, testing, spacer, or hole abandonment fluids. Yet more specifically, the field of this invention is fluid rheology, thickeners, viscosifiers, viscoelastic fluids, and the physical hydration of polymer additives into high density mixed-brine-based drilling, drill-in, completion, hydraulic fracturing, work-over, packer, well treating, testing, spacer, or hole abandonment fluids.

2. Discussion of Related Art

A wide variety of methods for exploiting subterranean petroliferous formations are known in the art, and the problems associated therewith are also well known. Brines are commonly used in drilling, drill-in, work-over, hydraulic fracturing, completion, packer, well treating, testing, spacer, or hole abandonment fluids because of their wide density range and their character of being free of suspended solids and essentially non-damaging to subterranean petroliferous formations. During the process of drilling and completing an oil well, it is often desirable to add polymer and possibly bridging agents, to viscosify the drilling or completion fluid and thereby to control fluid loss to the formation. As fluids are lost into the formation, these materials filter out and build up a filter cake at the rock face which limits further flow of fluids into the formation. Some fluids nevertheless invariably flow into the formation and can interact with formation matrix in such a way as to reduce the permeability of the formation to the subsequent in-flow or out-flow of fluid, especially oil, gas, condensate or other fluid targeted for withdraw and use. This reduction in the rock permeability is termed "formation damage".

Xanthan gum is commonly used as a viscosifying polymer in brine-based drilling fluids whereas the cheaper hydroxyethyl cellulose (HEC) is commonly used in a work-over fluid. Xanthan gum has superior tolerance to high pH and temperature and has superior thixotropic properties compared to other viscosifying polymers. The viscosifying polymer is usually added to the brine to thicken it so that it will have, for example, high carrying capacity for the cuttings produced while drilling and high viscosity for a work-over fluid to control fluid loss and minimize formation damage. Xanthan gum also has the ability to impart gel character to a brine so that it will have high carrying capacity for drill cuttings even when the drilling process is interrupted and the fluid becomes quiescent.

HEC is a typical viscosifier and fluid loss control agent which is known to cause relatively little damage to the formation. Guar gum and starch derivatives can also be used. However, HEC and other polymers are very slow to viscosify brines having densities above about 12.0 ppg and HEC does not viscosify formate brines. Heating can be required to reach a desired viscosity for some brines.

For many applications of brine-based drilling fluids, HEC lacks sufficient thermal stability and carrying capacity for the drill cuttings. In these cases, therefore, xanthan gum is typically used instead. While such agents as HEC and xanthan gum impart both viscosity and fluid loss control to the drilling, drill in, completion, hydraulic fracturing, work over, well treating, spacer, or hole abandonment fluids, starches are often added to augment the fluid loss properties. Standard brine based drilling fluid may also include a bridging agent, such as, for example, sized particles of calcium carbonate or sodium chloride. In addition, a representative brine based drilling fluid can also include, for example, corrosion inhibitors, lubricants, pH control additives, surfactants, solvents, and/or weighting agents.

Conventional techniques for viscosifying a brine are limited by the fact that so much of the water in the brine is devoted to solubilization of the salt that there is not enough water left over for the solubilization of the viscosifying agent. In effect, the viscosifying agent is "salted out". Additionally, mixed-salt brines are often limited by salt solubilities to relatively low densities. For example, when a dense brine based on NaBr is added to a dense brine based on $Ca(NO_3)_2$, the precipitation of solid $NaNO_3$ depletes the solution so much that the remaining brine is only of relatively moderate density. As another example, the same sort of interaction and precipitation occurs when a dense brine based on $CaCl_2$ or $CaBr_2$ is added to a dense brine based on $K_2CO_3$. The present invention teaches a group of mixed salts which are preferred because they can be formulated up to relatively high densities and yet the availability of "free" water is sufficient to allow viscosifying polymers to hydrate acceptably up to relatively high concentrations. Hence, inventive mixed-salt compositions are capable of exhibiting relatively high viscosities.

Problems occur when attempting to use xanthan gum to viscosify high concentrations of divalent-cation-based brines where most of the water is associated with salt. These problems include the need for extended mixing times, high shear, and/or heat in order to viscosify the brine. Similar problems occur with other viscosifiers. These problems are relatively minor in the brine concentration range extending most of the way from fresh water to almost saturated brine, then suddenly the problems get much more serious when just a relatively small amount of extra salt is added to a near-saturated brine.

One example is viscosifying xanthan gum in brines having high concentrations of $CaBr_2$, where most of the water is occupied by the salt. This system requires extended mixing times, high shear, and/or heat in order to viscosity the brine. (See Table 1A).

TABLE 1A

| wt. % $CaBr_2$ | % saturation | Base Brine Density (ppg) | Steps Needed to Viscosify the Brine Uniformly @ 1–5 ppb |
|---|---|---|---|
| 0 to 47.9 | 0.0 to 83.5 | 8.3 to 13.5 | Stirring xanthan gum into the brine at room temperature; no extra shear needed; no extra heating needed. |

TABLE 1A-continued

| wt. % CaBr$_2$ | % saturation | Base Brine Density (ppg) | Steps Needed to Viscosify the Brine Uniformly @ 1-5 ppb |
|---|---|---|---|
| 48.5 to 51.3 | 84.5 to 89.4 | 13.6 to 14.1 | Stirring xanthan gum into the brine at room temperature followed by moderate shearing or mild warming. |
| 51.9 | 90.4 | 14.2 | Stirring xanthan gum into the brine followed by extensive shearing at room temperature or mild shearing combined with moderate heating. |
| 52.4 to 57.4 | 91.3 to 100.0 | 14.3 to 15.35 | Stirring xanthan gum into the brine at room temperature followed by extensive mixing and shearing while heating steadily until polymer hydrates sufficiently. |

The data clearly show the need for extended mixing times, high shear, and/or heat in order to viscosify CaBr$_2$ brines above about 85% saturation.

When 3 pounds per barrel (ppb) of xanthan gum is added to a 14.2 pounds per gallon (ppg) substantially pure CaBr$_2$ solution, stirred vigorously for an hour at room temperature, 70° F., and sheared for 10 minutes on a Silverson mixer Model L4RT at 4000 rpm, it does not viscosify by indication of a yield point (YP) of 0 measured on a variable speed rheometer. It was noticed that by stirring the solution energetically for one hour at 125° F. the xanthan gum viscosified with a YP of 62 and a viscosity at the 3 rpm reading of 2700 cp as shown in Table 1B. Stirring shears the solution but not nearly the amount of shear the Silverson mixer can provide.

To determine the temperature at a specific shear needed to viscosify 14.2 ppg CaBr$_2$ solutions, a Fann Model 50 study was performed to monitor the viscosity at shear and temperature with time. The solutions were slowly heated to 150° F. at 0.5 degrees per minute and allowed to remain at that temperature until maximum viscosity was achieved. Two separate tests were performed at shear rates of 511 sec$^{-1}$ (300 rpm) and 170 sec$^{-1}$ (100 rpm). The temperatures at which 25% of maximum viscosity was obtained were found to be 122° F. and 143° F., respectively. FIG. 1 illustrates these results and shows that 2.5 additional hours are needed to viscosify the solution at 170 sec$^{-1}$ (100 rpm) than at 511 sec$^{-1}$ (300 rpm). Table 1B below also shows the maximum viscosity of this 14.2 ppg CaBr$_2$ solution obtained by different methods. This indicates that heating and shearing equipment would be needed in order to fully viscosity this solution.

It has been shown that biopolymers like xanthan gum show a transition temperature ($T_m$) in brines of various densities. A transition temperature is the temperature at which the polymer undergoes an order-disorder conformation change. This conformation change is accompanied by a massive loss of viscosity and increase in the rate of hydrolytic degradation by two orders of magnitude. It has also been shown that CaBr$_2$ solutions above 10.4 ppg have a $T_m$ of less than 80° C. and that degradation occurs at higher densities. $T_m$ has been used as a guide for predicting thermal stability of the polymers in brine solutions.

A variety of well servicing fluids and associated systems have been proposed in the prior art. There has remained a need for improved systems having advantageous characteristics for viscosification and fluid loss control, dispersability and hydration. Accordingly, the present invention is directed toward enhancing the thermal stability, viscosity and gel structure of dense brine-based drilling, drill-in, completion, hydraulic fracturing, work-over, packer, well treating, testing, spacer, or hole abandonment fluids and toward increasing the thermal stability of the water-soluble or water-dispersable polymer used to viscosity and gel the brines.

SUMMARY OF THE INVENTION

According to the present invention, there are provided mixed salt compositions that are viscosified easily and have superior stability compared to a corresponding single salt composition having a similar density. For example, the present inventors have discovered that a 14.2 ppg CaBr$_2$ and CaCl$_2$ mixture is extremely difficult or impossible to fully viscosify with xanthan gum or other viscosifiers without

TABLE 1B 14.2 ppg CaBr$_2$ + 3 ppb of Xanthan

| RPM | Viscosity, cp 70° F. | Viscosity, cp 70° F. | Viscosity, cp 70° F. | Viscosity, cp 70° F. |
|---|---|---|---|---|
| 600 | 11 | 78 | 81 | 84 |
| 300 | 11 | 109 | 109 | 107 |
| 3 | | 2700 | 2600 | 2400 |
| PV | 11 | 47 | 53 | 61 |
| YP | 0 | 62 | 56 | 46 |
| n | | 0.32 | 0.33 | 0.33 |
| K, cp | | 7000 | 6700 | 6100 |
| Method | Stirred 1 hour at 70° F., shear 10 min/4000 rpm | Stirred energetically for 1 hour at 125° F. | Fann Model 50 at 170 sec$^{-1}$ at 150° F. for 5 hrs. | Fann Model 50 at 511 sec$^{-1}$ at 150° F. for 2 hrs. | introducing significant heat and shear; however, if a 13.6 ppg $CaBr_2$ solution is weighted with dry NaBr to 14.2 ppg it is relatively easier to viscosity without the introduction of significant shear or heat. The present inventors have also discovered, for example, that the stability of biopolymers in a calcium-based brine is dramatically improved when the formulation of the base brine is optimized with respect to the calcium chloride and calcium bromide content.

According to the present invention there are provided high-density, viscosified, aqueous compositions having superior stability under stress factors such as aging, heat, mechanical agitation and shear. Inventive compositions comprise water; a water-soluble or water-dispersable polymer; one or more cation selected from the group consisting of lithium, sodium, potassium, cesium, magnesium, calcium, zinc, or mixtures thereof; and one or more anion selected from the group consisting of chloride, bromide, iodide, formate, nitrate, acetate, cyanate, thiocyanate, a zinc complex anion, or mixtures thereof; wherein there are present either at least two cations or at least two anions in effective amounts to provide advantageous stability. In alternate preferred aspects of the invention, inventive compositions have superior heat stability, exhibited by a $\tau_{50}$ of at least about 1; superior shear stability, exhibited either by a $\zeta_{50}$ of at least about 1 or by a $\omega_{50}$ of at least about 1; superior fluid loss control, exhibited by a $\psi_{50}$ of at most about 1; or superior pH stability, exhibited by a $\Phi$ of at least about 1.

Also provided by the present invention are methods for making high-density, viscosified, aqueous compositions having superior stability under stress factors. In a preferred aspect of the invention, the method comprises providing an aqueous solution comprising a first amount of one or more cation selected from the group consisting of lithium, sodium, potassium, cesium, magnesium, calcium, zinc, or mixtures thereof and a second amount of one or more anion selected from the group consisting of chloride, bromide, iodide, formate, nitrate, acetate, cyanate, thiocyanate, a zinc complex anion, or mixtures thereof, wherein there are present either at least two cations or at least two anions in effective amounts to provide the advantageous viscosification stability; and mixing a water-soluble or water dispersable polymer into the solution to yield a final composition having a $\tau_{50}$ of at least about 1; a $\zeta_{50}$ of at least about 1; a $\omega_{50}$ of at least about 1; a $\psi_{50}$ of at most about 1; or a $\Phi$ of at least about 1. Preferably, the aqueous solution is prepared by dissolving into water at least two salts, as described herein, to provide a salt solution having a density of greater than about 9.5 pounds per gallon (ppg). Additionally provided are methods for using inventive high-density, viscosified, aqueous compositions including using the compositions as drilling, drill-in, completion, hydraulic fracturing, work-over, packer, well treating, testing, spacer, or hole abandonment fluids.

It is an object of the present invention to provide mixed salt systems that are viscosified easily compared to a single salt system having similar density.

Additionally, it is an object of the present invention to provide a viscosified mixed salt system that displays greater stability under such stressing factors as aging, heat, mechanical agitation, and shear, compared to the single salt system of similar density.

Another object of the present invention is to provide high density mixed-salt brines having more stable rheological properties, especially at elevated temperatures and over extended periods of time, and which rheological properties are more resistant to heat- and shear-degradation.

It is also an object of the invention to provide viscosified high density mixed-salt brines having low crystallization temperatures and broad ranging compatibility with, for example, fluid-loss agents, sea water, formation water and spacers.

Additional objects, features and advantages will be apparent from the following description.

DESCRIPTION OF THE PREFERRED EMBODIMENTS

Figure 1:
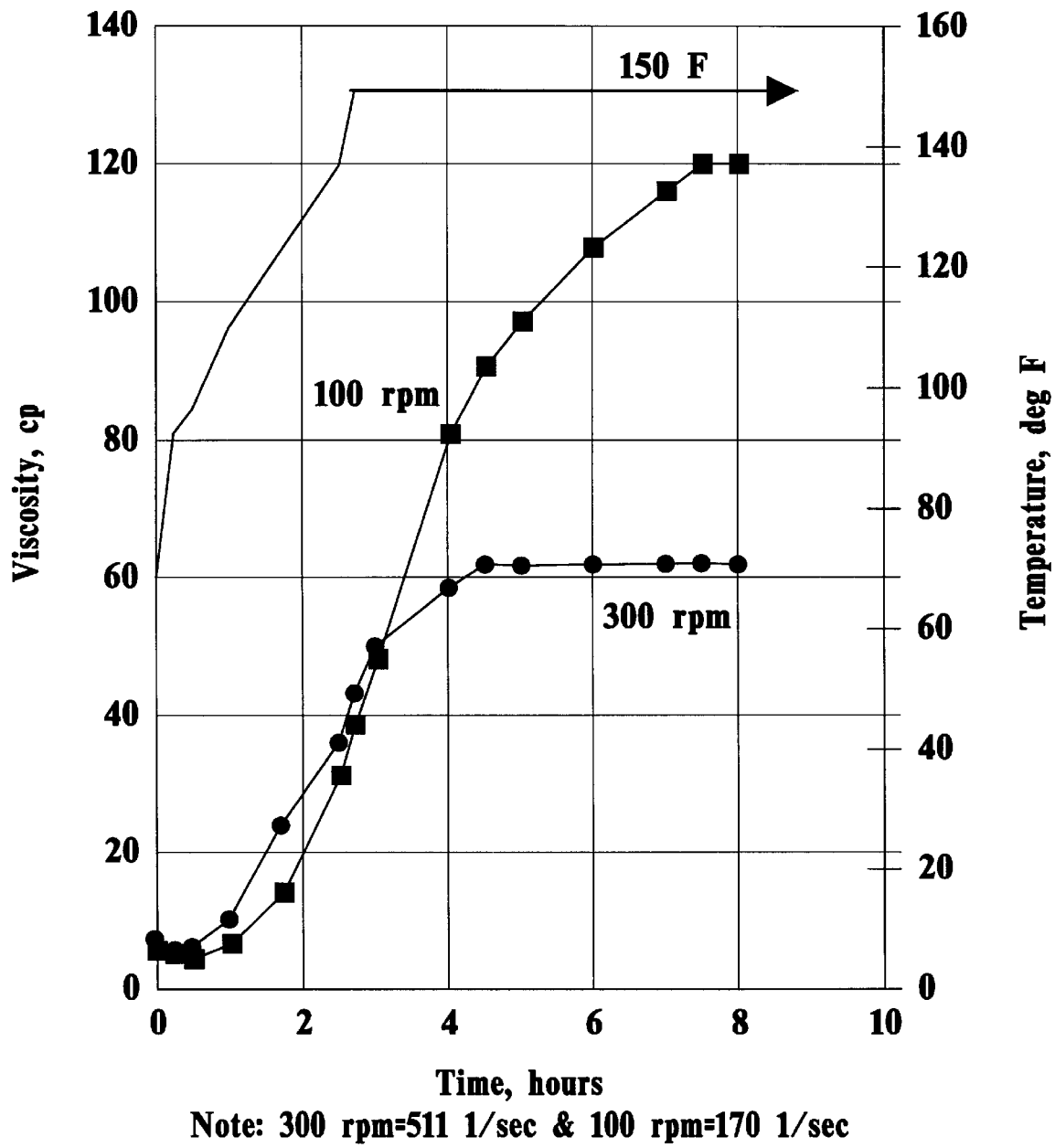
FIG. 1 is a plot of viscosity and temperature versus time and displays the temperature at a specific shear needed to viscosify 14.2 ppg $CaBr_2$ solutions.

For the purpose of promoting an understanding of the principles of the invention, reference will now be made to preferred embodiments thereof and specific language will be used to describe the same. It will nevertheless be understood that no limitation of the scope of the invention is thereby intended, such alterations and further modifications in the invention, and such further applications of the principles of the invention as described therein being contemplated as would normally occur to one skilled in the art to which the invention relates.

The present invention provides high density, viscosified, aqueous compositions having superior stability under stress factors such as aging, heat, mechanical agitation and shear. To advantageously practice the present invention, starting materials include at least two different salts, each comprising a cation selected from the group consisting of lithium, sodium, potassium, cesium, magnesium, calcium, zinc, or mixtures thereof; and an anion selected from the group consisting of chloride, bromide, iodide, formate, nitrate, acetate, cyanate, thiocyanate, a zinc complex anion, or mixtures thereof. Salts advantageously used in accordance with the present invention are readily available commercially.

In one preferred composition according to the invention, there are present a cation having a +2 charge and a cation having a +1 charge. In an alternate preferred aspect of the invention the first cation and the second cation each have a +2 charge. In another preferred aspect of the invention, the composition comprises a chloride anion and a bromide anion. Examples of preferred salt combinations useful for preparing inventive compositions include the following:

lithium chloride/lithium bromide
calcium chloride/calcium bromide
sodium bromide/calcium bromide
lithium bromide/sodium bromide
lithium bromide/calcium bromide
sodium chloride/potassium chloride
sodium chloride/calcium bromide
sodium chloride/sodium bromide
sodium bromide/potassium bromide
sodium formate/sodium nitrate
sodium formate/potassium nitrate
potassium formate/sodium nitrate
sodium formate/cesium nitrate
cesium formate/sodium nitrate
potassium formate/cesium nitrate
cesium formate/potassium nitrate
lithium formate/cesium nitrate
cesium formate/lithium nitrate
potassium formate/calcium nitrate
calcium formate/potassium nitrate
potassium formate/potassium nitrate
cesium formate/cesium nitrate
potassium chloride/potassium bromide
potassium bromide/calcium bromide
potassium chloride/calcium bromide
potassium formate/calcium bromide
magnesium chloride/calcium chloride
magnesium chloride/calcium bromide
magnesium bromide/calcium bromide
magnesium chloride/magnesium bromide
cesium chloride/cesium bromide
cesium chloride/sodium chloride
cesium bromide/sodium chloride
cesium chloride/sodium bromide
cesium bromide/sodium bromide
cesium chloride/potassium chloride
cesium bromide/potassium chloride
cesium chloride/potassium bromide
cesium bromide/potassium bromide
cesium chloride/calcium chloride
cesium bromide/calcium chloride
cesium chloride/calcium bromide
cesium bromide/calcium bromide
calcium chloride/calcium formate
calcium bromide/calcium nitrate
calcium bromide/cesium bromide
zinc complex salts/alkali metal or alkaline earth metal salts More detailed descriptions of various selected compositions prepared in accordance with the present invention appear below in the Examples. It should be noted that in inventive compositions, the salts are substantially dissolved into water. As such, a statement that a particular inventive composition includes two salts is intended to mean that the composition includes the cations and anions of the salt, although these cations and anions may be, for example, in the ionic state or complexed with other ions or materials.

It is also contemplated by the present invention that preferred compositions may be prepared using as starting materials three or more different salts. In this regard, in one preferred aspect, inventive compositions comprise three different cations, a first cation having a +2 charge, a second cation having a +2 charge, or a second cation in which the cation is held as a complex having cationic, neutral, or anionic form, and a third cation having a +1 charge.

Another starting material for the practice of the invention is a water-soluble or water-dispersable polymer. Preferably the polymer used in accordance with the present invention is a biopolymer, and is more preferably selected from the group consisting of algin; anionic cellulose; anionic polysaccharide; cationic polysaccharide; carboxymethyl cellulose; carboxymethyl hydroxyethyl cellulose; gellan gum; guar gum; gum ghatti; gum karaya; gum tragacanth; gum arabic; gum acacia; locust bean gum; methacrylic acid polymer; polyamine; polyanionic cellulose; iota, lambda or kappa sulfated polysaccharides; polysaccharides modified by i) cross-linking, ii) hydroxyethylation, iii) hydroxypropylation, iv) carboxymethyl-hydroxyethylation, v) carboxymethylhydroxypropylation, vi)carboxymethylation, or vii) carboxylation; rhamsan gum; vinyl compound polymer; wellan gum or glycol-compatible wellan gum; xanthan or xanthan gum; or mixtures of said polymers. More preferably, the polymer is selected from the group consisting of anionic polysaccharide; cationic polysaccharide; gellan gum; guar gum; rhamsan gum; wellan gum; xanthan or xanthan gum or modifications of said polymers by I) cross-linking, ii) hydroxyethylation, iii) hydroxypropylation, iv) carboxymethyl-hydroxyethylation, v) carboxymethyl-hydroxypropylation, vi)carboxymethylation, or vii) carboxylation; or mixtures of said polymers. It is readily understood that additional polymers having thixotropic properties or gel structure properties similar to those specifically mentioned may also be advantageously used in accordance with the present invention. Polymers useful according to the present invention are readily available commercially.

Inventive compositions are, generally, dense salt solutions viscosified with a polymer. Inventive compositions comprise water; a water-soluble or water-dispersable polymer; one or more cation selected from the group consisting of lithium, sodium, potassium, cesium, magnesium, calcium, zinc, or mixtures thereof; and one or more anion selected from the group consisting of chloride, bromide, iodide, formate, nitrate, acetate, cyanate, thiocyanate, a zinc complex anion or mixtures thereof; wherein there are present either at least two cations or at least two anions in effective amounts to impart to the composition advantageous stability under stressing factors such as heat, shear and pH.

Inventive compositions are preferably prepared from the following starting materials in the proportions given: from about 10.0 to about 90.0 weight percent water; from about 0.01 to about 45.0 weight percent polymer; from about 0.05 to about 85.0 weight percent of a first salt; and from about 0.05 to about 85.0 weight percent of a second salt. In an alternate preferred embodiment, also added is from about 0.05 to about 85.0 weight percent of a third salt. More preferably, inventive compositions are prepared using the following proportions of starting materials: from about 0.5 to about 10 weight percent polymer; from about 2 to about 80 weight percent of a first salt; and from about 2 to about 40 weight percent of a second salt and optionally from about 2 to about 80 percent of a third salt. Additionally, the relative amounts of each salt may advantageously be optimized with minimal experimentation to accomplish the desired results described herein.

It is readily understood by one of ordinary skill in the art that additional materials may also be included in preferred compositions. Examples of such additives include starch, bridging agents (such as, for example, sized particles of calcium carbonate or sodium chloride), corrosion inhibitors, lubricants, pH control additives, surfactants and/or weighting agents.

In another aspect of the invention, high-density, viscous compositions are made by first providing an aqueous solution having dissolved therein at least one cation selected from the group consisting of lithium, sodium, potassium, cesium, magnesium, calcium, zinc, or mixtures thereof, and at least one anion selected from the group consisting of chloride, bromide, iodide, formate, nitrate, acetate, cyanate, thiocyanate, a zinc complex anion, or mixtures thereof, wherein there is present either at least two cations or at least two anions in amounts effective to achieve the desired stability; and then mixing a water-soluble or water-dispersable polymer into the brine. The aqueous solution may be provided, for example, by dissolving into water a first salt and a second salt, each comprising a cation selected from the group consisting of lithium, sodium, potassium, cesium, magnesium, calcium, zinc, or mixtures thereof; and an anion selected from the group consisting of chloride, bromide, iodide, formate, nitrate, acetate, cyanate, thiocyanate, a zinc complex anion, or mixtures thereof. Preferably the resulting salt solution has a density of greater than about 9.5 pounds per gallon (ppg), more preferably greater than about 10 ppg, and yet more preferably greater than about 11.5 ppg.

Alternatively, the polymer is added to a brine, having dissolved therein one salt, before adding the second salt either in the form of a brine or a solid salt. The resulting composition in either instance preferably includes at least about 0.1 pounds per barrel (ppb) of the polymer, at least about 1% cations by weight, and at least about 1% anions by weight; more preferably at least about 0.2 ppb polymer, at least about 5% cations by weight, and at least about 5% anions by weight; and most preferably at least about 0.4 ppb polymer, at least about 10% cations by weight, and at least about 10% anions by weight.

Depending upon the specific salt composition of a given system, the addition of the polymer may be facilitated by heating the mixture while stirring. An advantageous feature of the invention, however, is the relative ease with which polymers may be hydrated by relatively dense salt solutions. This feature is described in greater detail below in the Examples with regard to various selected inventive compositions. In one preferred aspect of the invention, the polymer is mixed into the brine by first hydrating, solvating or swelling the polymer at least partially in a fluid medium, and then mixing the fluid medium with the brine.

Compositions of the present invention exhibit superior stability under such stressing factors as aging, heat, mechanical agitation and shear, this feature being very important in fluids utilized in the field of subterranean drilling. The term "stability" as used herein is intended to refer to the ability of an inventive composition to withstand various stress conditions before the viscosifying polymer's capability to viscosifying the fluid composition is substantially diminished. By "substantially diminished" it is meant diminished to an extent where the composition may no longer be advantageously used for its intended purpose. Diminished viscosity is commonly referred to in the relevant trade as fluid degradation.

A technique used to measure relative heat stability involves a determination of $\tau_{50}$ of a mixed salt/polymer composition. To determine $\tau_{50}$ of an inventive composition, $T_{50}$ of a mixed salt composition is determined and related to the $T_{50}$ of one or more of the related single salt systems according to the following equation:

$$\tau_{50} = \frac{2 * T_{50}(A/B)}{T_{50}(A) + T_{50}(B)}$$

wherein (A/B) indicates that the preceding value is a property of the two salt system; (A) represents a corresponding single salt system; and (B) represents the other corresponding single salt system. The term "corresponding single salt system" as used herein is intended to designate a composition consisting essentially of only cations and anions derived from one salt, this salt being one of the salts dissolved in the preparation of the particular inventive two or three salt composition. $T_{50}$ of a composition is determined by heating the composition at a given rate and recording the temperature at which the viscosity of the composition is half of its viscosity at room temperature. In one aspect of the invention, inventive two salt systems exhibit a $\tau_{50}$ of greater than about 1. This means that the $T_{50}$ of the inventive two salt system is greater than expected based upon the linear relationship between $T_{50}$ values for the two corresponding single salt systems. As such, there are two corresponding single salt systems for each inventive two salt system. Table 1C shows $\tau_{50}$ computations for various systems according to the present invention.

TABLE 1C $\tau_{50}$ of Various Mixed Salt Systems

| Density (ppg) | Mixed Salt System A/B | $\tau_{50} = \dfrac{2 \times T_{50}(A/B)}{T_{50}(A) + T_{50}(B)}$ | $T_{50}$ (A/B) (F.°) | $T_{50}$ (A) (F.°) | $T_{50}$ (B) (F.°) |
|---|---|---|---|---|---|
| 12.5 | LiBr/NaBr (50/50) | 1.084 | 219.5 | 114 | 291 |
| 12.5 | LiBr/NaBr (25/75) | 1.296 | 262.5 | 114 | 291 |
| 13.0 | LiBr/CaBr$_2$ | 1.780 | 266 | 114 | 184.8 |
| 9.0 | NaCl/NaBr | >1.0 | 300 | 300 | >291 |
| 10.5 | NaCl/NaHCO$_2$ | 1.173 | 352 | 300 | 300 |
| 9.0 | NaCl/KCl | 1.000 | 300 | 300 | 300 |
| 10.5 | MgCl$_2$/CaBr$_2$ | 1.041 | 255 | 268 | 222 |

TABLE 1C-continued $\tau_{50}$ of Various Mixed Salt Systems

| Density (ppg) | Mixed Salt System A/B | $\tau_{50} = \dfrac{2 \times T_{50}(A/B)}{T_{50}(A) + T_{50}(B)}$ | $T_{50}$ (A/B) (F.°) | $T_{50}$ (A) (F.°) | $T_{50}$ (B) (F.°) |
|---|---|---|---|---|---|
| | (35.6/64.4) | | | | |
| 10.5 | $CaCl_2/CaBr_2$ | 1.117 | 257 | 238 | 222 |
| 12.5 | $NaBr/KHCO_2$ | 0.842 | 294 | 290.7 | 408 |
| 10.5 | $MgCl_2/CaCl_2$ | 0.949 | 240 | 268 | 238 |
| 10.5 | $MgCl_2/CaBr_2$ (50/50) | 0.992 | 243 | 268 | 222 |
| 10.5 | $MgCl_2/CaBr_2$ (45/55) | 0.988 | 242 | 268 | 222 |
| 10.5 | $MgCl_2/CaBr_2$ (30/70) | 0.986 | 241.6 | 268 | 222 |
| 10.5 | $MgCl_2/CaBr_2$ (25/75) | 0.967 | 237 | 268 | 222 |
| 13.0 | $CaBr_2/Ca(NO_3)_2$ | 0.935 | 202.5 | 184.8 | 248.3 |

Although various systems have $\tau_{50}$ values slightly less than 1, these systems have improved characteristics according to various other aspects of the invention, such as, for example, improved shear stability, improved pH stability and/or improved ability to control fluid loss into a formation.

Another important feature of fluids utilized in the subterranean drilling industry is shear stability or stability under shear stress. The term "shear" is intended to refer to the ratio between a stress (force per unit area) applied laterally to a material and the strain resulting from this force. Determination of this ratio is one method of measuring the viscosity of a liquid or semisolid. One manner of measuring shear stability involves a determination of $\zeta_{50}$. To determine $\zeta_{50}$ of an inventive composition, $\xi_{50}$ of a mixed salt composition is determined and related to the $\xi_{50}$ of one or more of the related single salt systems according to the following equation:

$$\zeta_{50} = \frac{2 * \xi_{50}(A/B)}{\xi_{50}(A) + \xi_{50}(B)}$$

$\xi_{50}$ represents the time, in an experiment conducted at no greater than $T_{50}$, at which sustained shear degradation at a shear stress rate of at least 1021 sec$^{-1}$ causes the mixture viscosity to drop to 50% of its initial value at that same temperature ($T_{50}$). The viscosity is measured at both initial and final conditions at a shear stress rate of 170 sec$^{-1}$. In one aspect of the invention, inventive two salt systems exhibit a $\zeta_{50}$ of greater than about 1. This means that the $\xi_{50}$ of the inventive two salt system is greater than expected based upon the linear relationship between the $\xi_{50}$ values for the two corresponding single salt systems. As before, there are two corresponding single salt systems for each inventive two salt system.

Another manner of measuring shear stability involves a determination of $\omega_{50}$. To determine $\omega_{50}$ of an inventive composition, $\sigma_{50}$ of a mixed salt composition is determined and related to the $\sigma_{50}$ of one or more of the related single salt systems according to the following equation:

$$\omega_{50} = \frac{2 * \sigma_{50}(A/B)}{\sigma_{50}(A) + \sigma_{50}(B)}$$

$\sigma_{50}$ represents the shear rate, in an experiment conducted at a temperature no greater than $T_{50}$, at which sustained shear degradation for at least 30 minutes causes the mixture viscosity to drop to 50% of its initial value at that same temperature ($T_{50}$). The viscosity is measured at both initial and final conditions at a shear stress rate of 170 sec$^{-1}$. In one aspect of the invention, inventive two salt systems exhibit a $\omega_{50}$ of greater than about 1. This means that the $\sigma_{50}$ of the inventive two salt system is greater than expected based upon the linear relationship between the $\sigma_{50}$ values for the two corresponding single salt systems.

Another important feature of fluids utilized in the subterranean drilling industry is fluid loss control. The term "fluid loss" is intended to refer to the leak-off of fluid into the rock matrix. One manner of measuring fluid loss control involves a determination of $\psi_{50}$. To determine $\psi_{50}$ of an inventive composition, $\rho_{50}$ of a mixed salt composition is determined and related to the $\rho_{50}$ of one or more of the related single salt systems according to the following equation:

$$\psi_{50} = \frac{2 * \rho_{50}(A/B)}{\rho_{50}(A) + \rho_{50}(B)}$$

$\rho_{50}$ represents the ratio of the API standard fluid loss volume, in an experiment conducted at a temperature no greater than $T_{50}$ after 16 hours of rolling heat aging at a temperature no greater than $T_{50}$. In one aspect of the invention, inventive two salt systems exhibit a $\psi_{50}$ of less than about 1. This means that the $\rho_{50}$ of the inventive two salt system is less than expected based upon the linear relationship between the $\rho_{50}$ values for the two corresponding single salt systems. As before, there are two corresponding single salt systems for each inventive two salt system.

Another important feature of fluids utilized in the subterranean drilling industry is pH stability. It is widely known to those skilled in the art that such processes as acid- or base-catalyzed hydrolytic degradation can lead to loss of viscosifying capability on the part of the polymer. Accordingly, the process of formulating a viscosified fluid involves searching for a pH range wherein these chemical degradation processes are held to acceptable rates and then maintaining the fluid pH within that range throughout subsequent use of the viscosified fluid. The term "pH stability" is intended to refer to the resistance of the fluid to change in pH over time. One manner of measuring pH stability involves a determination of $\Phi$. To determine $\Phi$ of an inventive composition, $\phi$ of a mixed salt composition is determined and related to the $\phi$ of one or more of the related single salt systems according to the following equation:

$$\phi = \frac{2 * \varphi(A/B)}{\varphi(A) + \varphi(B)}$$

φ represents a ratio of viscosities and pH changes determined as follows: The fluid is formulated and its initial properties, pH and viscosity at 170 sec$^{-1}$, are measured. Then the fluid is subjected to 16 hours of rolling heat aging at a temperature no greater than $T_{50}$; and the final properties, including pH and viscosity at 170 sec$^{-1}$, are measured. The parameter φ is then determined from the following equation:

$$\varphi = \frac{\text{final viscosity at a given shear rate}}{\text{final pH- initial pH}}$$

The φ values for the single salt and multiple salt systems are measured similarly and used to measure Φ according to the above equation. In one aspect of the invention, inventive two salt systems exhibit a Φ of greater than about 1. This means that the $\phi_{50}$ of the inventive two salt system is greater than expected based upon the linear relationship between the φ values for the two corresponding single salt systems.

In use, inventive compositions are preferably utilized in exploiting subterranean petroliferous formations as drilling, drill-in, completion, hydraulic fracturing, work-over, packer, well treating, testing, spacer or hole abandonment fluids. For instance, in a preferred use as a hydraulic fracturing fluid, a viscosified mixed salt brine fluid is introduced into a formation at a rate and pressure sufficient to fracture the formation. At first, the fluid leaks off into the rock matrix, building up a filter cake on the rock face. The filter cake then prevents fluid injected thereafter from leaking off significantly. The full force of the applied hydraulic pressure eventually comes to bear upon the rock face, causing the rock to part at the weakest point. As the fracture grows, additional fracturing fluid containing a solid proppant material is introduced. Following this treatment, as much as possible of the introduced fluid is recovered from the formation, but the proppant remains to prevent the complete closure of the fracture. The propped fracture creates a highly conductive channel extending from the well bore into the formation, making the reservoir more productive.

High viscosity fracturing fluids undergo high shear stress during the introduction of such fluids into a formation. The viscosity of the fluid must be high enough to carry proppant but low enough that excessive friction losses and high well head pumping pressures are not encountered. Polymer degradation is a natural result of shear stresses imposed by pumping, the presence of abrasive materials, and high flow rates through small flow channels. This mechanical degradation accompanies thermal degradation and chemical degradation produced by acid catalyzed hydrolysis of the acetal bonds which are the weakest links along the polymer backbone.

The invention will be further described with reference to the following specific Examples. It will be understood that these Examples are illustrative and not restrictive in nature.

EXAMPLE ONE

PREPARING INVENTIVE DENSE, VISCOSIFIED AQUEOUS COMPOSITIONS

Two salts are selected and prepared by dissolving the salts into water. The following salt combinations are used:
 lithium chloride/lithium bromide
 calcium chloride/calcium bromide
 sodium bromide/calcium bromide
 lithium bromide/sodium bromide
 lithium bromide/calcium bromide
 sodium chloride/potassium chloride
 sodium chloride/calcium bromide
 sodium chloride/sodium bromide
 sodium bromide/potassium bromide
 sodium formate/sodium nitrate
 sodium formate/potassium nitrate
 potassium formate/sodium nitrate
 sodium formate/cesium nitrate
 cesium formate/sodium nitrate
 potassium formate/cesium nitrate
 cesium formate/potassium nitrate
 lithium formate/cesium nitrate
 cesium formate/lithium nitrate
 potassium formate/calcium nitrate
 calcium formate/potassium nitrate
 potassium formate/potassium nitrate
 cesium formate/cesium nitrate
 potassium chloride/potassium bromide
 potassium bromide/calcium bromide
 potassium chloride/calcium bromide
 potassium formate/calcium bromide
 magnesium chloride/calcium chloride
 magnesium chloride/calcium bromide
 magnesium bromide/calcium bromide
 magnesium chloride/magnesium bromide
 cesium chloride/cesium bromide
 cesium chloride/sodium chloride
 cesium bromide/sodium chloride
 cesium chloride/sodium bromide
 cesium bromide/sodium bromide
 cesium chloride/potassium chloride
 cesium bromide/potassium chloride
 cesium chloride/potassium bromide
 cesium bromide/potassium bromide
 cesium chloride/calcium chloride
 cesium bromide/calcium chloride
 cesium chloride/calcium bromide
 cesium bromide/calcium bromide
 calcium chloride/calcium formate
 calcium bromide/calcium nitrate
 calcium bromide/cesium bromide
 zinc complex salts/alkali metal or alkaline earth metal salts After the salts are dissolved into the water to a density of at least about 9.5, a water-soluble or water-dispersible polymer is hydrated into the solution, thus viscosifying the solution for advantageous use as a drilling, drill-in, completion, hydraulic fracturing, work-over, packer, well treating, testing, spacer, or hole abandonment fluid. Amounts of each salt in relation to one another are determined such that the resulting viscosified fluid has a $\tau_{50}$ of at least about 1; a $\zeta_{50}$ of at least about 1; a $\omega_{50}$ of at least about 1; a $\psi_{50}$ of at most about 1; or a Φ of at least about 1. Preferably, the ratio of the first salt to the second salt in inventive two salt systems is from about 50/1 to about 1/50.

EXAMPLE TWO

PREPARING INVENTIVE DENSE, VISCOSIFIED AQUEOUS COMPOSITION

Inventive dense, viscosified aqueous compositions are prepared according to Example 1 except that the polymer is hydrated into a solution having dissolved therein only one of the salts of a two salt combination. After hydration of the polymer, the second salt in the two salt composition is added either in the form of a dry salt or in a salt solution.

EXAMPLE THREE

TESTING PROPERTIES OF INVENTIVE DENSE, VISCOSIFIED AQUEOUS COMPOSITIONS

Viscosity Measurements

A fluid is prepared as in Example 1 or Example 2 and Theological properties are measured and recorded at 120° F. using a rotational viscometer such as the Fann 35 at the following rpms: 600, 300, 200, 100, 6 and 3. Also measured and recorded are the pH of the fluid at 120° F., and the 10 second and 10 minute gels.

Determining Heat Stability

One "barrel equivalent" (BEQ) of the fluid is hot rolled at a predetermined temperature for 16 hours; and one BEQ of the fluid is hot rolled at the predetermined temperature for 72 hours (or 48/96 hours if time is available for longer testing). A normal 42 gallon barrel has a weight in pounds equal to ($42 \times \rho$), where $\rho$ is the density of the fluid in pounds per gallon. The BEQ is obtained by simply replacing the weight of the barrel in pounds by the weight of the barrel equivalent in grams. This replacement scales the convenient field unit, the barrel, into a workable laboratory size unit, BEQ. After the rheological properties are recorded from the Fann 35 or equivalent for the 16/72 hour or 48/96 hour samples, as indicated above, the samples are examined for evidence of sag, break, or settling and the visual observations are logged. The gels of hot rolled samples of inventive compositions are preferably within the range of from about 6 to about 19.

Fluid Loss Testing

The fluid loss properties of the fluid are determined as follows. A fluid loss test of duration ranging from 30 minutes to 24 hours is performed in the API standard high pressure high temperature (HP-HT) apparatus. If additional time for testing is available, a 48 hour test duration may be preferable. The testing temperature is predetermined, such as, for example, in accordance with the bottom-hole temperature at which the fluid will be used in the field. The HP-HT apparatus is employed using 250 to 600 psig differential pressure, using, for example, a 50–2000 millidarcy Aloxite disc of diameter of 2.50 inches and thickness of 0.25 inches.

The cell in the heating jacket and the fluid in the static oven are preheated until the cell and sample reach the test temperature. While the cell is being heated, the disc is covered with a thin layer of de-ionized water. The cover (lid) for the cell should also be put in place to prevent evaporation.

The fluid being tested is preheated and then poured into the preheated cell. The loaded cell is then prepared for the application of pressure. The cell is pressurized and the temperature adjusted to the target temperature. The discharge valve is then opened, and the filtrate volume is recorded at time intervals such as 1, 5, 7.5, 10, 15, and 30 minutes, and at 1, 2, 4, 16, 24, and/or 48 hours. The fluid loss volume may then be plotted versus $(\text{time})^{1/2}$. This plot is, in most cases, substantially linear. If the plot is linear, the fluid loss behavior is considered normal. Whether or not this is the case is noted in the laboratory notebook.

At 24 or 48 hours, the test is stopped and the cell is cooled and depressurized. It is then noted whether any sag, settling or break has occurred in the fluid in the cell during the pressurized phase of testing. The fluid is then decanted and the filter cake thickness is measured.

EXAMPLE FOUR $CaCl_2/CaBr_2$

The present inventors have discovered that the stability of biopolymers in a calcium-based brine is dramatically improved when the formation of the base brine is optimized with respect to the calcium chloride and calcium bromide content. At equivalent densities, brine fluids containing calcium chloride and calcium bromide exhibit more stable rheological and gel structure properties with biopolymers than do the corresponding pure calcium chloride brines or pure calcium bromide brines. When the pH of the viscosified fluid is buffered with magnesium oxide in the traditional manner, the rheology of calcium chloride/calcium bromide brines is considerably more stable than the equivalent pure calcium chloride system. For brine densities up to 13.0 ppg or more, the stability of calcium chloride/calcium bromide systems is greater than for the corresponding pure calcium bromide systems.

Rheological and gel structure data for 9.0 pounds per gallon (ppg), 10.5 ppg and 13.0 ppg calcium-based brines are reported in Table 2, Table 3 and Table 4, respectively. For each brine, the concentration of calcium chloride and calcium bromide are reported as a percent of the total brine salt present (%TS), which is varied from 100% calcium chloride to 100% calcium bromide for the 9.0 and 10.5 ppg brines and from 45% calcium chloride for the 13 ppg fluid. The enhanced thermal stability, rheology and gel structure properties for the calcium chloride/calcium bromide brines are clearly depicted when compared with the corresponding pure salt brines—a result which is totally unexpected based on conventional wisdom in the relevant field.

TABLE 2

| | 9.0 ppg Viscosified Brine 2 ppg Bio-Polymer & 2 ppb MgO Heat Aged 16 & 72 Hours @ 180° F. | | | | | | | |
|---|---|---|---|---|---|---|---|---|
| $CaCl_2$, % TS | 100 | | 60 | | 31 | | 0 | |
| $CaBr_2$, % TS | 0 | | 40 | | 69 | | 100 | |
| Aging Hours | 16 | 72 | 16 | 72 | 16 | 72 | 16 | 72 |
| PV/YP | 5/19 | 5/15 | 5/15 | 5/15 | 5/21 | 5/17 | 6/17 | 5/16 |
| Gels | 7/9 | 4/4 | 3/3 | 4/4 | 10/13 | 8/11 | 9/13 | 6/7 |
| pH | 8.8 | 8.9 | 8.7 | 8.8 | 9.0 | 8.5 | 9.0 | 8.6 |
| Settling | No | No | No | No | No | No | No | No |

% TS - Specified salt as a percent of total soluble salt content.

TABLE 3

10.5 ppg Viscosified Brine
2 ppg Bio-Polymer & 2 ppb MgO
Heat Aged 16 & 72 Hours @ 180° F.

| $CaCl_2$, % TS | 100 | | 86 | | 60 | | 31 | | 0 | |
|---|---|---|---|---|---|---|---|---|---|---|
| $CaBr_2$, % TS | 0 | | 14 | | 40 | | 69 | | 100 | |
| Aging Hours | 16 | 72 | 16 | 72 | 16 | 72 | 16 | 72 | 16 | 72 |
| PV/YP | 9/7 | 7/2 | 9/18 | 8/12 | 9/18 | 8/16 | 7/21 | 7/18 | 7/16 | 6/12 |
| Gels | 0/0 | 0/0 | 3/3 | 1/1 | 5/7 | 5/5 | 6/8 | 6/7 | 4/4 | 2/2 |
| pH | 7.4 | 7.6 | 7.7 | 7.8 | 8.3 | 8.3 | 8.6 | 8.4 | 8.1 | 8.5 |
| Settling | Yes | Yes | No | Yes | No | No | No | No | No | Yes |

% TS - Specified salt as a percent of total soluble salt content.

TABLE 4

13.0 ppg Viscosified Brine
2 ppg Bio-Polymer & 2 ppb MgO
Heat Aged 16 & 72 Hours @ 180° F.

| $CaCl_2$, % TS | 45 | | 22 | | 16 | | 0 | |
|---|---|---|---|---|---|---|---|---|
| $CaBr_2$, % TS | 55 | | 78 | | 84 | | 100 | |
| Aging Hours | 16 | 72 | 16 | 72 | 16 | 72 | 16 | 72 |
| PV/YP | 21/28 | 24/33 | 17/21 | 19/18 | 16/15 | 15/15 | 14/15 | — |
| Gels | 9/10 | 9/10 | 5/6 | 3/5 | 1/1 | 1/1 | 1/1 | — |
| pH | 6.7 | 6.8 | 7.1 | 7.1 | 7.5 | 7.1 | 7.2 | — |
| Settling | No | No | Yes | Yes | Yes | Yes | Yes | — |

% TS - Specified salt as a percent of total soluble salt content.

Figure 2:
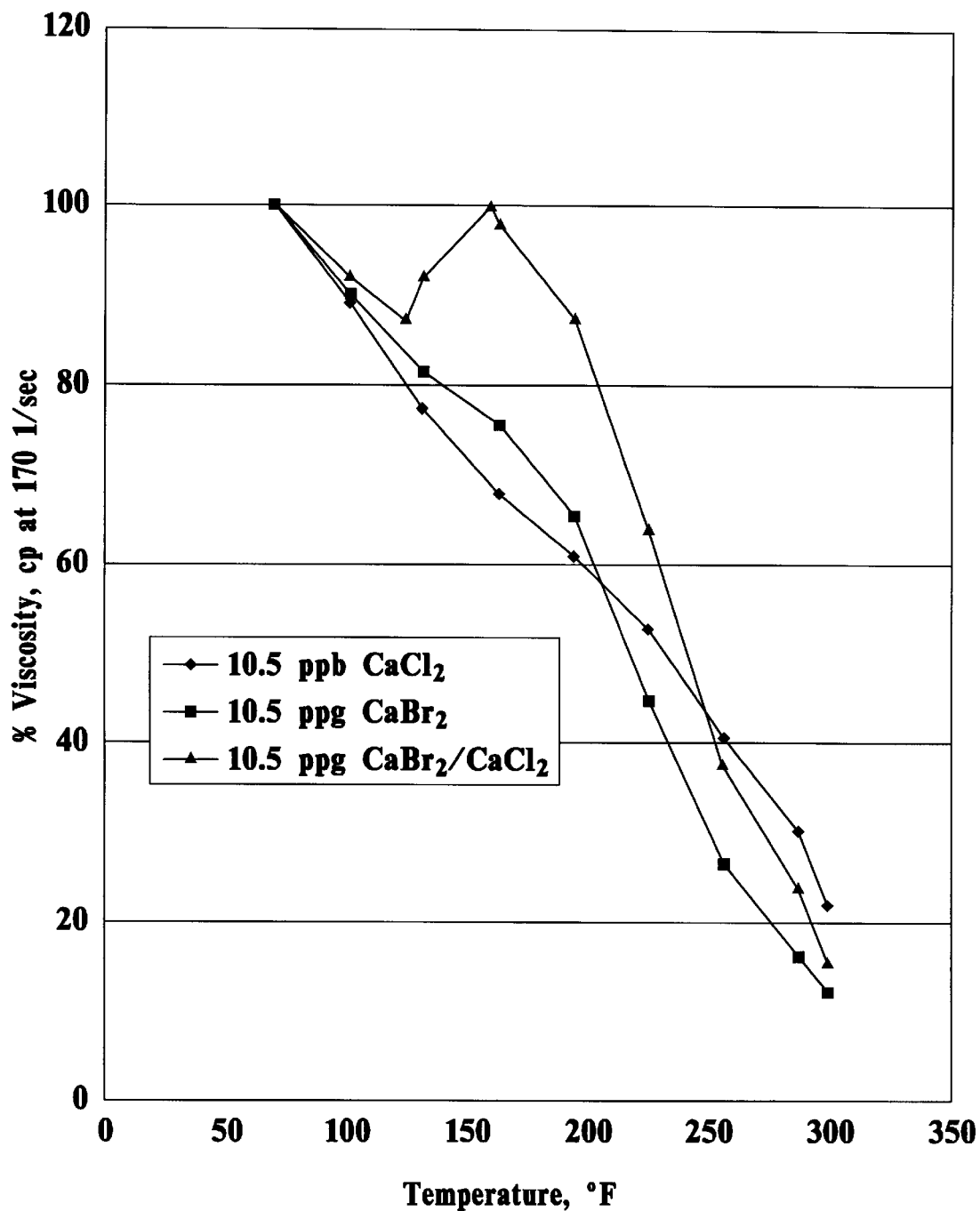
FIG. 2 is a plot of percent viscosity versus temperature for two single salt systems and one mixed salt system.

These surprising results were again verified when a Fann Model 50 evaluation was performed on the 10.5 ppg $CaCl_2$, 10.5 ppg $CaBr_2$, and 10.5 ppg mixed $CaCl_2/CaBr_2$ solutions, this type of test being well known in the art. Results shown in FIG. 2 for the two pure halide systems display a continuous rapid decline in brine viscosity with increasing temperature. Unexpectedly, the mixed halide system shows higher viscosity than either pure halide at a given temperature for a broad range from room temperature to well over 220° F. The brine systems were initially prepared by adding the biopolymer to the brines and then hydrating each system with the same shearing treatment using a Silverson mixer. When the biopolymer is not completely hydrated, its viscosity increases with heating as the biopolymer fully hydrates. In these experiments the Fann 50 supplies the heat. In the single-salt $CaCl_2$ and single-salt $CaBr_2$ experiments the viscosity did not increase when the fluids were heated, indicating that the biopolymer had been fully hydrated. However, with the mixed salt $CaCl_2/CaBr_2$ system, the viscosity did increase early in the experiment. In order to establish whether this observation was the result of biopolymer hydration, the experiment was repeated; but this time the $CaCl_2/CaBr_2$ mixture was blended from samples of viscosified $CaCl_2$ which had already been proven to be fully hydrated and of viscosified $CaBr_2$ which had already been proven to be fully hydrated. This new mixture was undeniably fully hydrated, and yet the results of the repeat experiment were almost exactly as before. This shows that the increase in viscosity seen with the two-salt mixture is not a hydration effect but a true indication of increased stability in the two-salt mixture in comparison with the corresponding single-salt systems of equal density.

Figure 3:
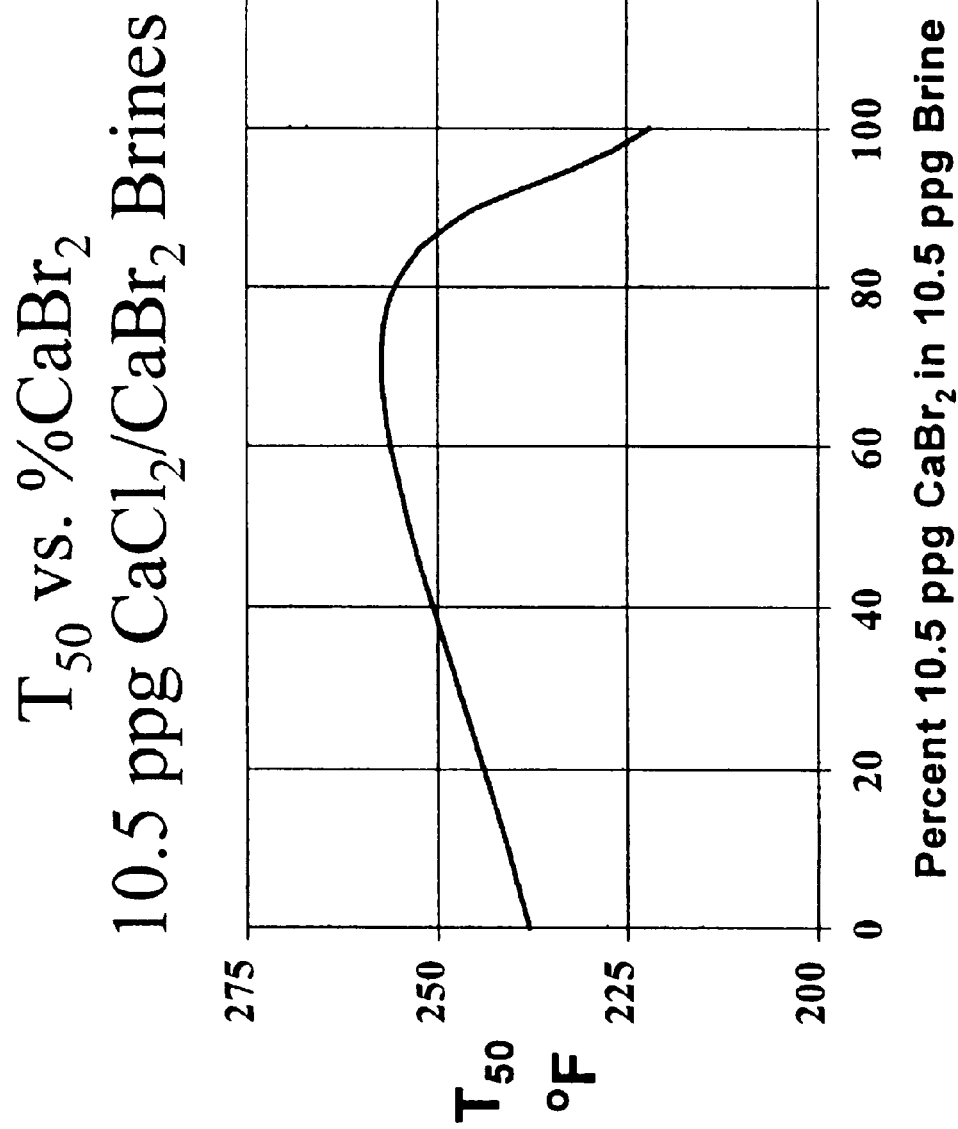
FIG. 3 is a plot of $T_{50}$ (° F.) versus percent $CaBr_2$ in a 10.5 ppg $CaCl_2/CaBr_2$ solution.

As was mentioned above, $T_{50}$ is defined as the temperature at which a fluid's viscosity reaches 50% of its original value measured at about room temperature. The surprising relationship between $T_{50}$ and percent $CaBr_2$ in the 10.5 ppg system is clearly demonstrated in FIG. 3.

Application of this invention to optimization of calcium-based brines can result in viscosified brines having unexpected and greatly improved stability. This substantial increase in stability permits the practical use of these brines for things such as drilling brines, drill-in fluids, fluid loss control pills and hydraulic fracturing fluids.

EXAMPLE FIVE $NaBr/CaBr_2$

The present inventors have discovered that by taking a $CaBr_2$ solution which can be viscosified with xanthan gum and weighting the solution to a higher density with dry NaBr, instead of $CaBr_2$ or $CaCl_2$, the time required to reach maximum viscosity is reduced substantially. Results of adding 3 pounds per barrel (ppb) of xanthan gum to 14.2 ppg solutions, one a pure $CaBr_2$ solution and the other a mixed $CaBr_2/NaBr$ solution, are shown in Table 5. Surprisingly, the two salt mixture began to viscosity after only 10 minutes of shearing, while the $CaBr_2$ solution required significantly more time and shear. The yield point (YP) for a solution is a good measure for the degree of polymer activation. The YP for the mixed $CaBr_2/NaBr$ salt system reached 12% of its final value in the first 10 minutes while the pure $CaBr_2$ system had none of its ultimate value. The two salt mixture fully viscosified within 22 hours of stirring after shearing while the $CaBr_2$ solution did not do so even after 42 hours of stirring.

TABLE 5

| | \multicolumn{8}{c}{14.2 ppg Solutions + 3 ppb of Xanthan Gum} |
|---|---|---|---|---|---|---|---|---|
| | $CaBr_2$ | $CaBr_2$/NaBr | $CaBr_2$ | $CaBr_2$/NaBr | $CaBr_2$ | $CaBr_2$/NaBr | $CaBr_2$ | $CaBr_2$/NaBr |
| 600 | 22 | 44 | 30 | 71 | 83 | 144 | 104 | 148 |
| 300 | 11 | 26 | 16 | 47 | 56 | 106 | 72 | 108 |
| 6 | 0 | 2 | 0 | 6 | 7 | 24 | 13 | 25 |
| 3 | 0 | 1 | 0 | 4 | 5 | 19 | 9 | 20 |
| Gels | 0/0 | 1/1 | 0/0 | 4/5 | 5/8 | 20/48 | 10/21 | 24/56 |
| PV | 11 | 18 | 14 | 24 | 27 | 38 | 32 | 40 |
| YP | 0 | 8 | 2 | 23 | 29 | 68 | 40 | 68 |
| Method | Sheared-Time | 10 Min. 4000 RPM | Sheared-Time | 18 min. 4000 RPM | Stirred-Time | 22 hours | Stirred-Time | 42 hours |

Figure 4:
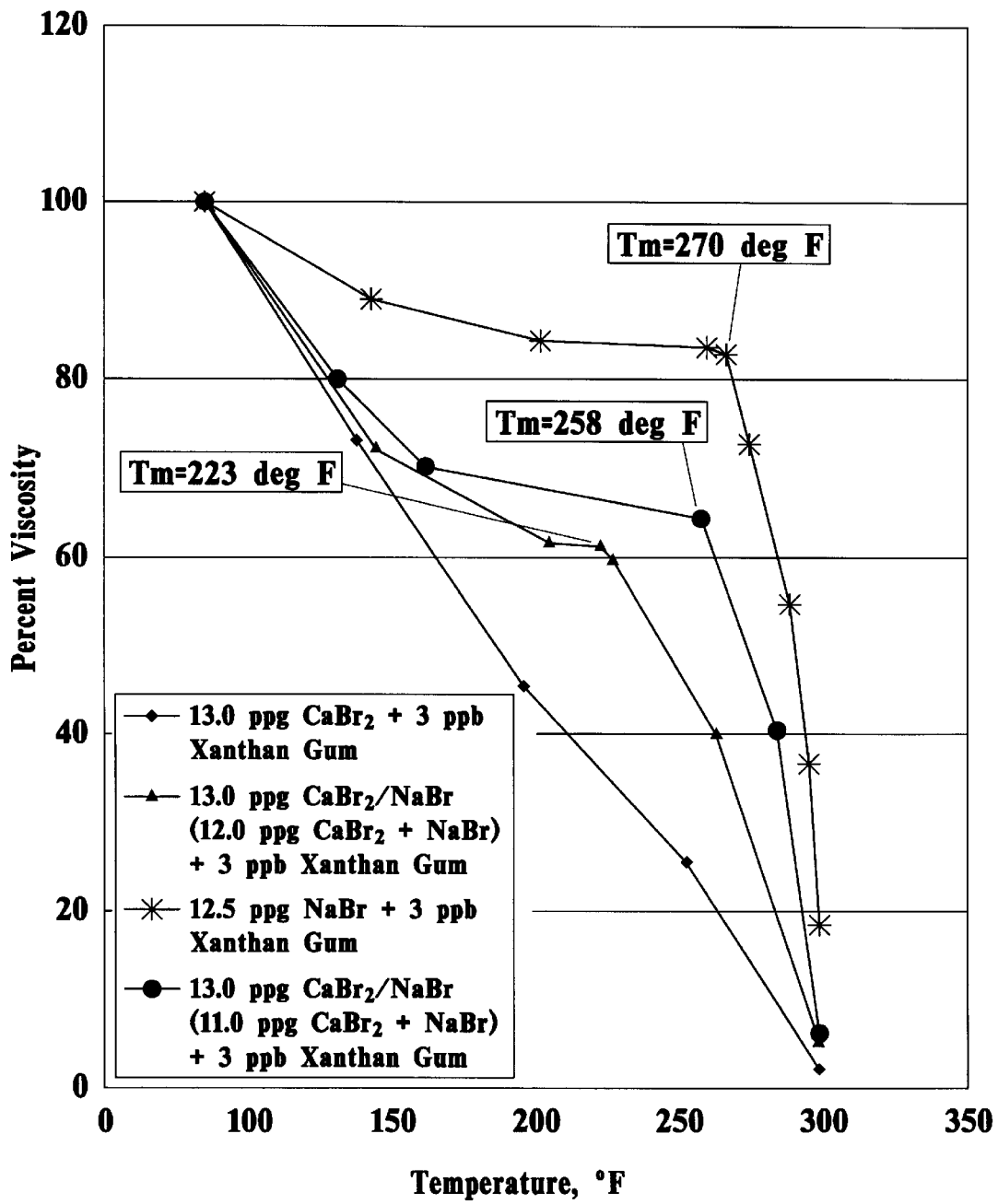
FIG. 4 is a plot of percent viscosity versus temperature, showing viscosity data and the $T_m$ for 12.5 ppg NaBr and mixtures of 13.0 ppg $CaBr_2$/NaBr and showing viscosity data for pure $CaBr_2$.
Figure 5:
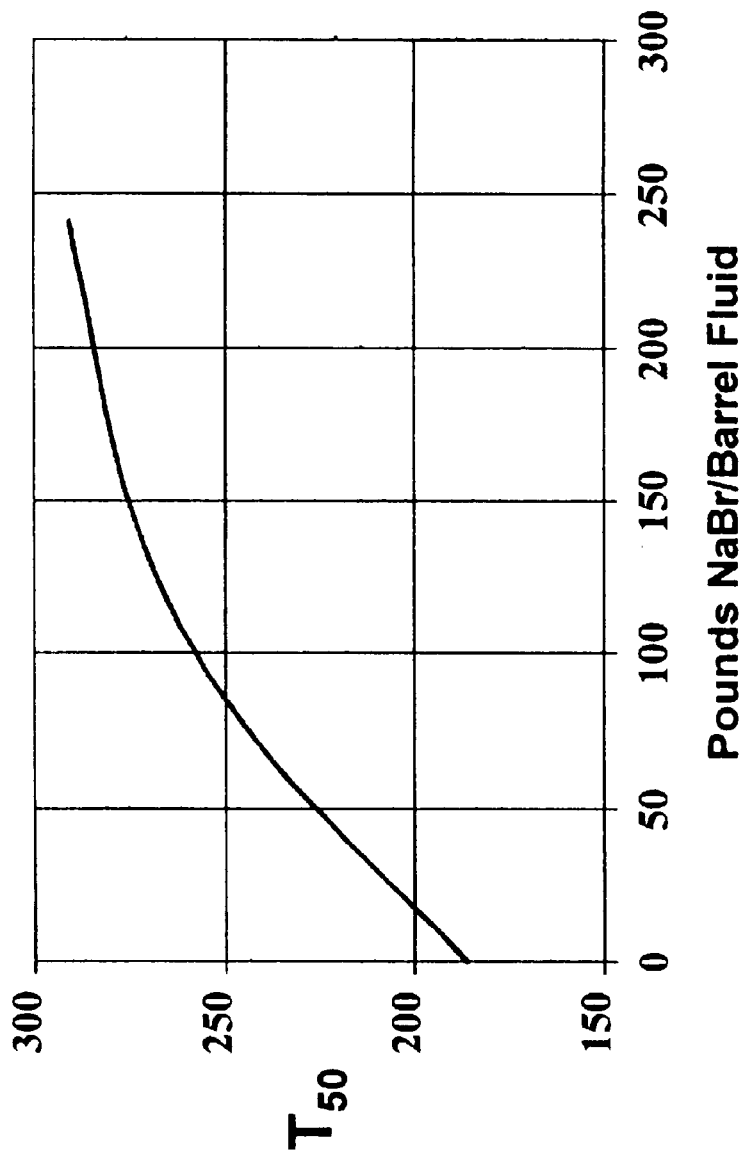
FIG. 5 is a plot of $T_{50}$ (° F.) versus pounds of NaBr per barrel for a 13 ppg $CaBr_2$/NaBr solution.

FIG. 4 shows the $T_m$ for 12.5 ppg NaBr, mixtures of 13.0 ppg $CaBr_2$/NaBr, and viscosity data for pure $CaBr_2$. The 13.0 ppg pure $CaBr_2$ solution shows no $T_m$, but with the introduction of NaBr, the $T_m$ increases with increasing concentrations of NaBr. In FIG. 5, $T_{50}$ is plotted versus the pounds of NaBr per barrel (ppb) of fluid. Unexpectedly, NaBr was found to substantially increase the $T_{50}$ of the mixed $CaBr_2$/NaBr brine fluids. This shows that the mixed salt system provides higher thermal stability than the pure $CaBr_2$ solution.

Figure 6:
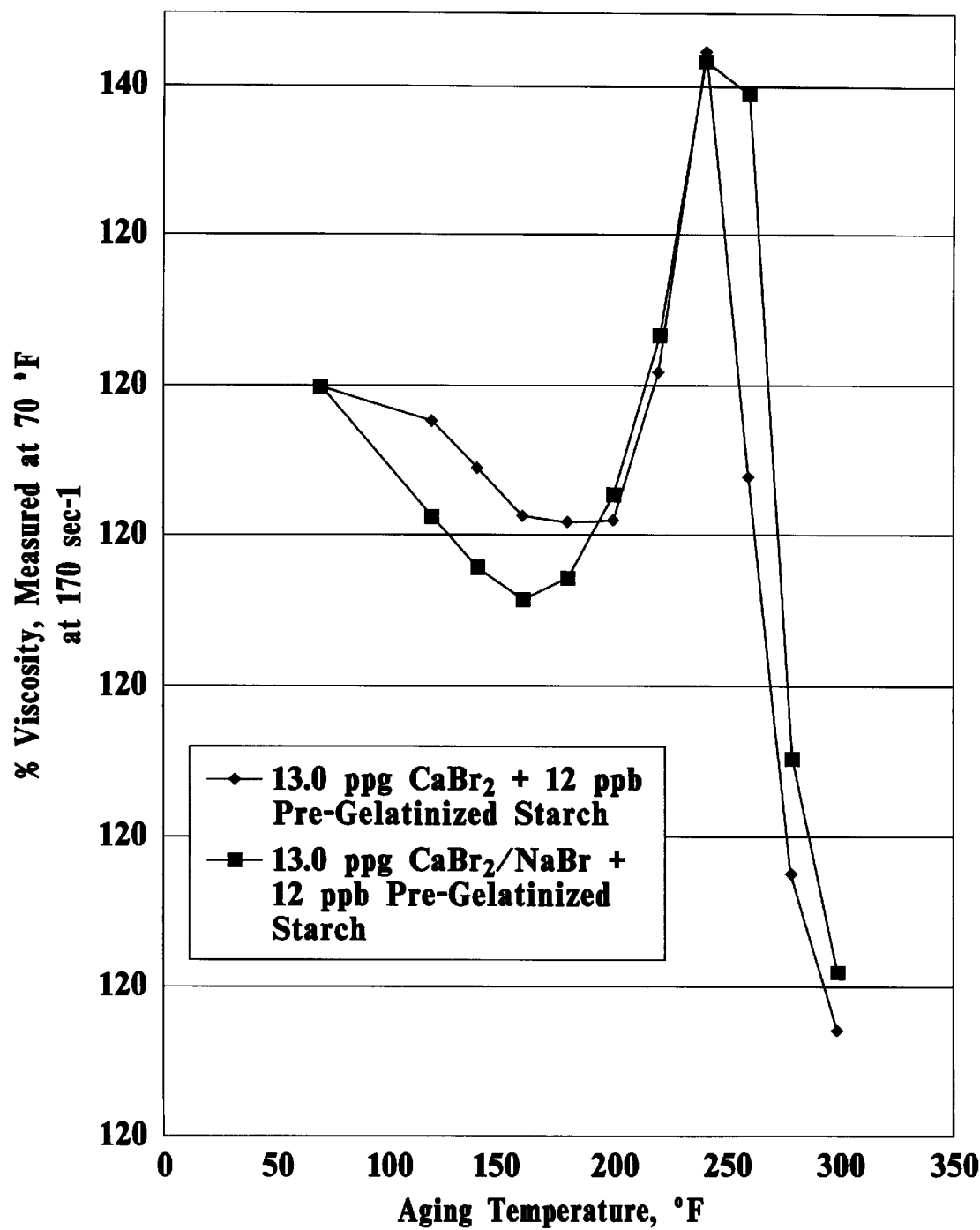
FIG. 6 is a plot of percent viscosity versus temperature for a test of thermal stability of pre-gelatinized starch as described more fully in Example 5.

To determine whether the mixed $CaBr_2$/NaBr salt system also increases the thermal stability of other polysaccharides, such as pre-gelatinized starch, which show no transition temperature, a heating and cooling cycle was conducted on 12 ppb of a pre-gelatinized starch added to a 13.0 ppg pure $CaBr_2$ solution and compared with 12 ppb of pre-gelatinized starch added to a 13.0 ppg mixed $CaBr_2$/NaBr salt system. The mixed salt system was prepared by taking 11.0 ppg $CaBr_2$ and weighting it up with dry NaBr until a 13.0 ppg solution was obtained. Each solution was heated at 2.56° F./minute in 20° F. increments at a shear rate of 170 sec$^{-1}$ beginning at 120° F. and then quick-cooled to 70° F. By using this heating and cooling cycle, the breakdown of the pre-gelatinized starch was determined and is shown in FIG. 6. The percent viscosities of both solutions begin to decrease to about 150° F. and then stop decreasing. However, when heated to 240° F. and cooled to 70° F., the pre-gelatinized starch in the 13.0 ppg pure $CaBr_2$ solution showed dramatic decrease in the retained percent viscosity while in the mixed salt system this phenomena occurred only after the higher temperature of 260° F. As such, FIG. 6 shows that the mixed salt system increases the thermal stability of the pre-gelatinized starch compared with the pure $CaBr_2$ solution.

EXAMPLE SIX

LiBr/NaBr

Figure 7:
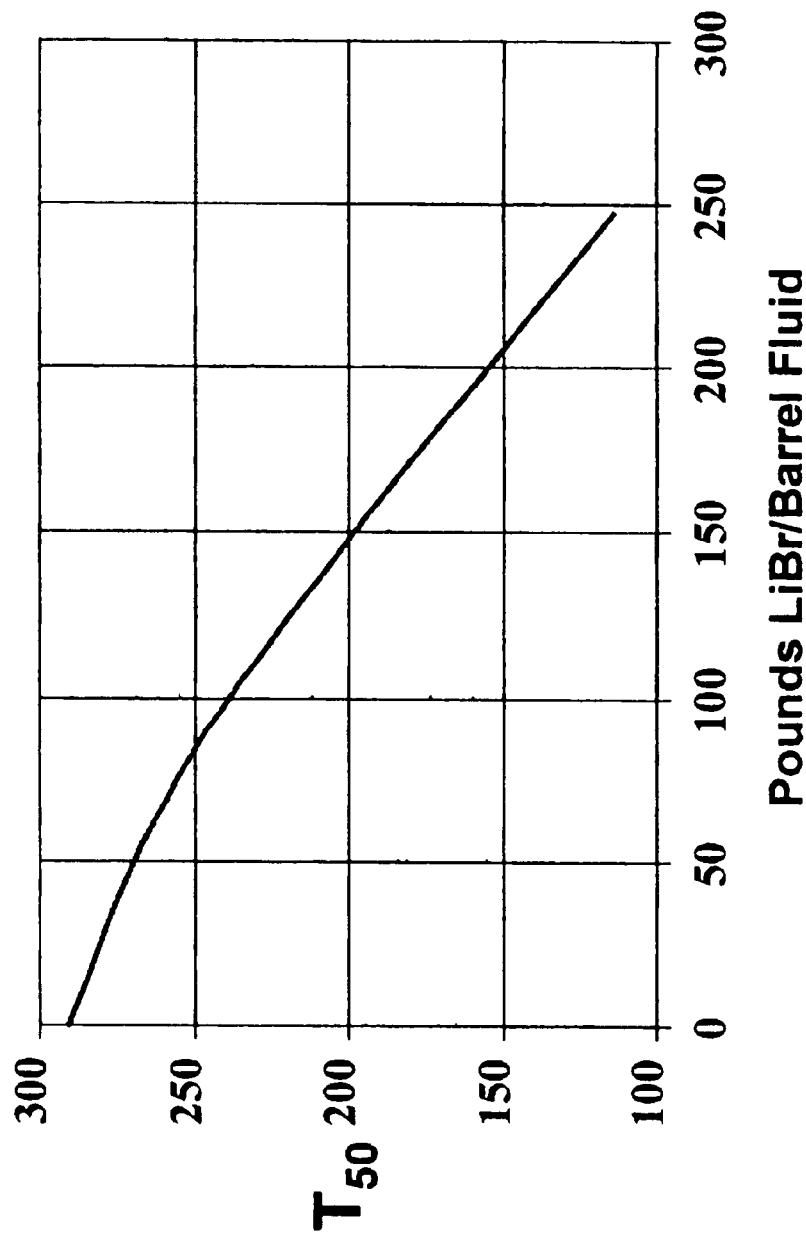
FIG. 7 is a plot of $T_{50}$ (° F.) versus pounds of LiBr per barrel for a 12.5 ppg NaBr/LiBr solution.

Table 6 presents $T_{50}$ data for the LiBr/NaBr mixed salt system. Two different ratios of LiBr to NaBr were tested and in both cases the data show improved stability for the xanthan-viscosified LiBr/NaBr mixed salt system in comparison with viscosified pure LiBr and viscosified pure NaBr. For example, if one interpolates linearly between the $T_{50}$ for 12.5 ppg LiBr, 114° F., and the $T_{50}$ for 12.5 ppg NaBr, 291° F. to predict the $T_{50}$ of the mixture, the actually observed $T_{50}$ values for the LiBr/NaBr mixtures are greater than those predicted. This comparison is illustrated graphically in FIG. 7 in which the $T_{50}$ values are plotted versus the pounds of LiBr added per barrel of fluid. The slightly upward curvature of the line joining pure NaBr (at 0) and pure LiBr shows the extra stabilization of the system when the brines are mixed.

TABLE 6

| | $T_{50}$ Data on Mixed Salts | | |
|---|---|---|---|
| Mixed Salt System A/B | $T_{50(A/B)}$ (° F.) | $T_{50(A)}$ (° F.) | $T_{50(B)}$ (° F.) |
| LiBr/NaBr (50/50) | 220 | 114 | 291 |
| LiBr/NaBr (25/75) | 263 | 114 | 291 |

EXAMPLE SEVEN

LiBr/$CaBr_2$

Figure 8:
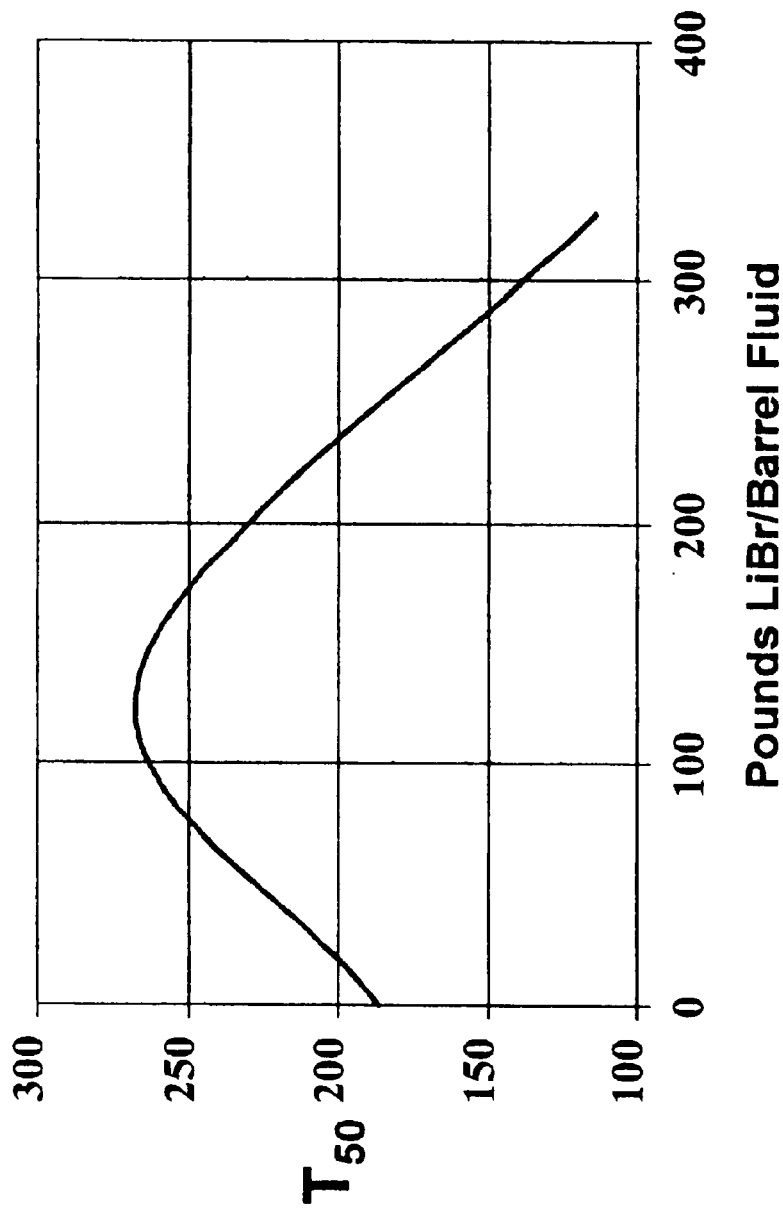
FIG. 8 is a plot of $T_{50}$ (° F.) versus pounds of LiBr per barrel for a 13 ppg $CaBr_2$/LiBr solution.

Table 7 presents $T_{50}$ data for the LiBr/$CaBr_2$ mixed salt system. When LiBr was added to $CaBr_2$, extreme improvement was observed in the stability for the xanthan-viscosified LiBr/$CaBr_2$ mixed salt system in comparison with viscosified pure LiBr and viscosified pure $CaBr_2$. For example, as one can see clearly in FIG. 8, observed data is significantly greater than that predicted by linear interpolation.

TABLE 7

| | $T_{50}$ Data on Mixed Salts | | |
|---|---|---|---|
| Mixed Salt System A/B | $T_{50(A/B)}$ (° F.) | $T_{50(A)}$ (° F.) | $T_{50(B)}$ (° F.) |
| LiBr/$CaCl_2$ | 266 | 114 | 184.8 |

EXAMPLE EIGHT

NaCl/KCl

Table 8 presents $T_{50}$ data for the 9.0 ppg NaCl/KCl mixed salt system. The data showed no improvement in heat stability for the xanthan-viscosified NaCl/KCl mixed salt system in comparison with viscosified pure NaCl and viscosified pure KCl. The data obtained for this two-salt system show no improvement over the corresponding single salt systems. Accordingly, in those systems wherein there is an observable improvement with the mixed salt systems over the corresponding single salts, said improvement is unexpected. Additionally, various systems which show no improvement in heat stability do show, for example, good shear stability and/or fluid loss control characteristics.

TABLE 8

$T_{50}$ Data on Mixed Salts

| Mixed Salt System A/B | $T_{50(A/B)}$ (° F.) | $T_{50(A)}$ (° F.) | $T_{50(B)}$ (° F.) |
|---|---|---|---|
| NaCl/KCl | 300 | 300 | 300 |

EXAMPLE NINE

NaCl/NaBr

As with the $CaCl_2/CaBr_2$ system discussed above, the rheological and fluid loss data presented in Table 9 demonstrate the increased effectiveness and stability with time of the mixed halide salt system when compared to the single NaCl salt system. This unexpected stability occurs in an especially important temperature range and greatly extends the useful range for these drilling brine systems.

TABLE 9

9.5 ppg Sodium-based Drilling Brines

| System | NaCl Test Temp | NaCl/NaBr Room | NaCl Time Temp | NaCl/NaBr 16 Hours 260° F. | NaCl Time Temp | NaCl/NaBr 72 Hours 260° F. |
|---|---|---|---|---|---|---|
| Rheological Properties | | | | | | |
| 6/3 RPM | 25/23 | 23/22 | 23/21 | 22/20 | 9/7 | 17/15 |
| Gels | 24/27 | 22/25 | 23/20 | 20/24 | 7/8 | 15/16 |
| PV | 17 | 19 | 9 | 9 | 10 | 11 |
| YP | 49 | 47 | 45 | 43 | 24 | 37 |
| Sample Temp, ° F. | 76 | 77 | 120 | 120 | 120 | 120 |
| HTHP Fluid Loss Test | | | | | | |
| Temperature, ° F. | | | 260 | 260 | | |
| Delta Pressure, psi | | | 500 | 500 | | |
| Core, md | | | 500 | 500 | | |
| 30 Minutes, ml | | | 15 | 4 | | |
| 48 Hours, ml | | | 85 | 73 | | |

Table 10 presents $T_m$ and $T_{50}$ data for the 9.0 ppg NaCl/NaBr mixed salt system. The data for pure NaBr are estimated. The analysis suggests no improvement in stability for the xanthan-viscosified NaCl/NaBr mixed salt system in comparison with the corresponding viscosified pure single salts, in contrast with the Table 9 data just discussed above.

TABLE 10

$T_m$ and $T_{50}$ Data on Mixed Salts

| Mixed Salt System A/B | $T_{m(A/B)}$ (° F.) | $T_{m(A)}$ (° F.) | $T_{m(B)}$ (° F.) | $T_{50(A/B)}$ (° F.) | $T_{50(A)}$ (° F.) | $T_{50(B)}$ (° F.) |
|---|---|---|---|---|---|---|
| NaCl/NaBr | 272 | 272 | ≈270 | 300 | 300 | ≈290 |

What is the resolution to this apparent contrast? First, the Table 9 data showed little or no difference at 16 hours, and only at 72 hours did a significant difference appear; the data in Table 10 are from tests which span less than two hours. If differences only appear after an extended duration they cannot be seen in data such as those of Table 10. Second, the Table 10 $T_m$ and $T_{50}$ data are all relatively high temperatures and the densities of the brines involved are all relatively low, 9.0 ppg. For other mixed brine systems, we have such data for generally higher brine densities, and often observe $T_m$ and $T_{50}$ values for the viscosified pure salts which are much lower than those of Table 10. In mixed salt brines having higher densities and lower $T_m$ and $T_{50}$ values for the viscosified pure salts, it is apparently easier to observe the benefit of improved stability due to the presence of the mixed brines when observing over the course of short experiments such as those of Table 10. The same phenomenon likely explains the Table 8 $T_{50}$ data for the 9.0 ppg NaCl/KCl mixed salt system.

EXAMPLE TEN

NaBr/KBr

Table 11 presents $T_{50}$ data for the 11.4 ppg NaBr/KBr mixed salt system. The data for pure NaBr are estimated. The analysis shows improvement in stability for the xanthan-viscosified NaBr/KBr mixed salt system in comparison with the corresponding viscosified pure single salts.

TABLE 11

$T_{50}$ Data on Mixed Salts

| Mixed Salt System A/B | $T_{50(A/B)}$ (° F.) | $T_{50(B)}$ (° F.) | $T_{50(B)}$ (° F.) |
|---|---|---|---|
| NaBr/KBr (50/50) | 300 | <291 | 300 |

EXAMPLE ELEVEN

$NaHCO_2/NaNO_3$

Figure 9:
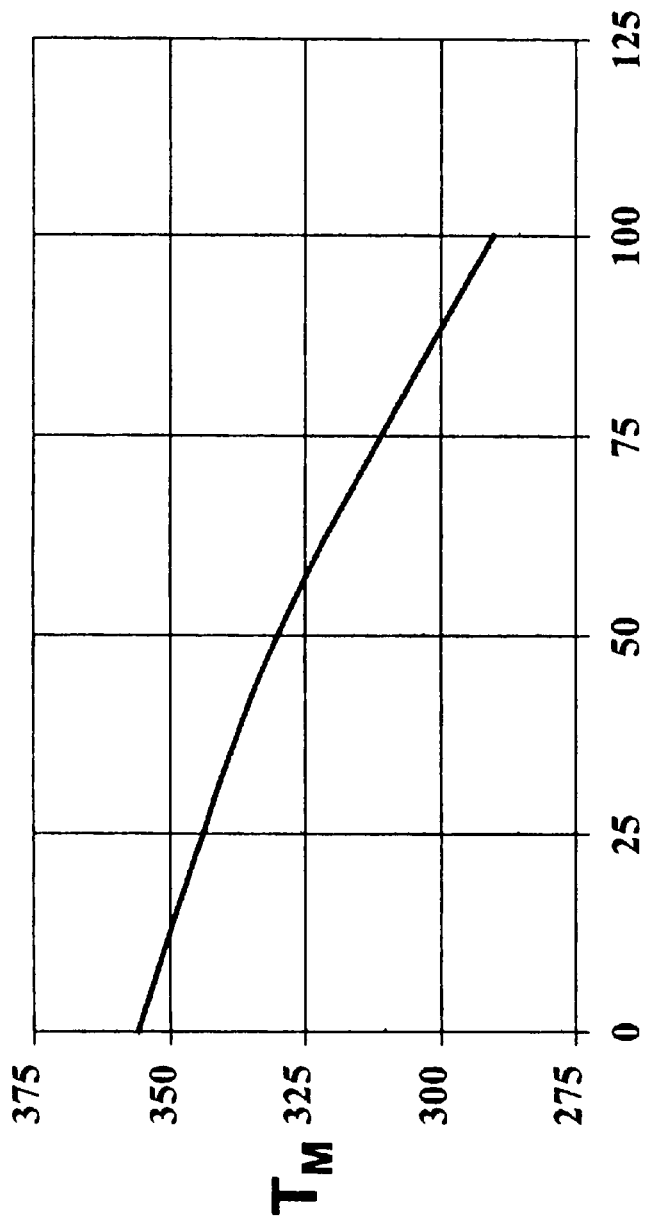
FIG. 9 is a plot of $T_m$ (° F.) versus percent 11.0 ppg $NaNO_3$ brine in 11.0 ppg $NaHCO_2/NaNO_3$ brine mixtures.

Table 12 presents $T_m$ data for the 11.0 ppg $NaHCO_2/NaNO_3$ mixed salt system. The data showed substantial improvement in stability for the xanthan-viscosified $NaHCO_2/NaNO_3$ mixed salt system in comparison with viscosified pure $NaHCO_2$ and viscosified pure $NaNO_3$. The 11.0 ppg mixture of $NaHCO_2/NaNO_3$ was a 50/50 mixture by weight of 11.0 ppg $NaHCO_2$ which has a $T_m$ of 356° F.

and 11.0 ppg $NaNO_3$ which has a $T_m$ of 290° F. Interpolation between these data predicts a $T_m$ of 323° F., whereas a substantially higher value, 330° F., was observed. This comparison is illustrated graphically in FIG. 9 in which the $T_{50}$ values are plotted versus the pounds of $NaNO_3$ added per barrel of fluid. The slightly upward curvature of the line joining pure $NaHCO_2$ (at 0) and pure $NaNO_3$ shows the extra stabilization of the system when the brines are mixed.

TABLE 12

| Mixed Salt System A/B | $T_{50}$ Data on Mixed Salts | | |
|---|---|---|---|
| | $T_{M(A/B)}$ (° F.) | $T_{M(A)}$ (° F.) | $T_{M(B)}$ (° F.) |
| $NaHCO_2/NaNO_3$ | 330 | 356 | 290 |

EXAMPLE TWELVE $KBr/CaBr_2$, $KHCO_2/CaBr_2$, and $KBr/Ca(HCO_2)_2$

Table 13 presents $T_{50}$ data for five mixed salt systems: a 13.0 ppg $LiBr/CaBr_2$ mixed salt system, a 13.0 ppg $NaBr/CaBr_2$ mixed salt systems, a 13.0 ppg $KBr/CaBr_2$ mixed salt system, a 13.2 ppg $KHCO_2/CaBr_2$ mixed salt system, and a 13.2 ppg $KBr/Ca(HCO_2)_2$ mixed salt system. The $LiBr/CaBr_2$ and the $NaBr/CaBr_2$ mixed salt systems have been discussed above. We were able to produce a solution comprising 42.3 weight % $CaBr_2$ and 4.7 weight % $KHCO_2$ and having a density of 13.2 ppg. Adding just a little more $KHCO_2$ would have led to formation of a precipitate; even so, it was found that the $T_{50}$ of the xanthan-viscosified $KHCO_2/CaBr_2$ mixed brine is substantially greater than the $T_{50}$ of a comparable xanthan-viscosified $CaBr_2$ brine.

The table also shows that the $T_{50}$ of the xanthan-viscosified $KBr/CaBr_2$ mixed brine is substantially greater than the $T_{50}$ of a comparable xanthan-viscosified $CaBr_2$ brine.

TABLE 13

| Density | Mixed Salt System A/B | $T_{50(A/B)}$ (° F.) | $T_{50(A)}$ (° F.) | $T_{50(B)}$ (° F.) |
|---|---|---|---|---|
| 13.0 ppg | $LiBr/CaBr_2$ | 266 | 114 | 185 |
| 13.0 ppg | $NaBr/CaBr_2$ (11.0 ppg + NaBr) | 273 | — | 185 |
| 13.0 ppg | $KBr/CaBr_2$ | 261 | | 185 |
| 13.2 ppg | $KHCO_2/CaBr_2$ | 231 | | 185 |
| 13.2 ppg | $KBr/Ca(HCO_2)_2$ | 231 | | |

EXAMPLE THIRTEEN $MgCl_2/CaCl_2$

Figure 10:
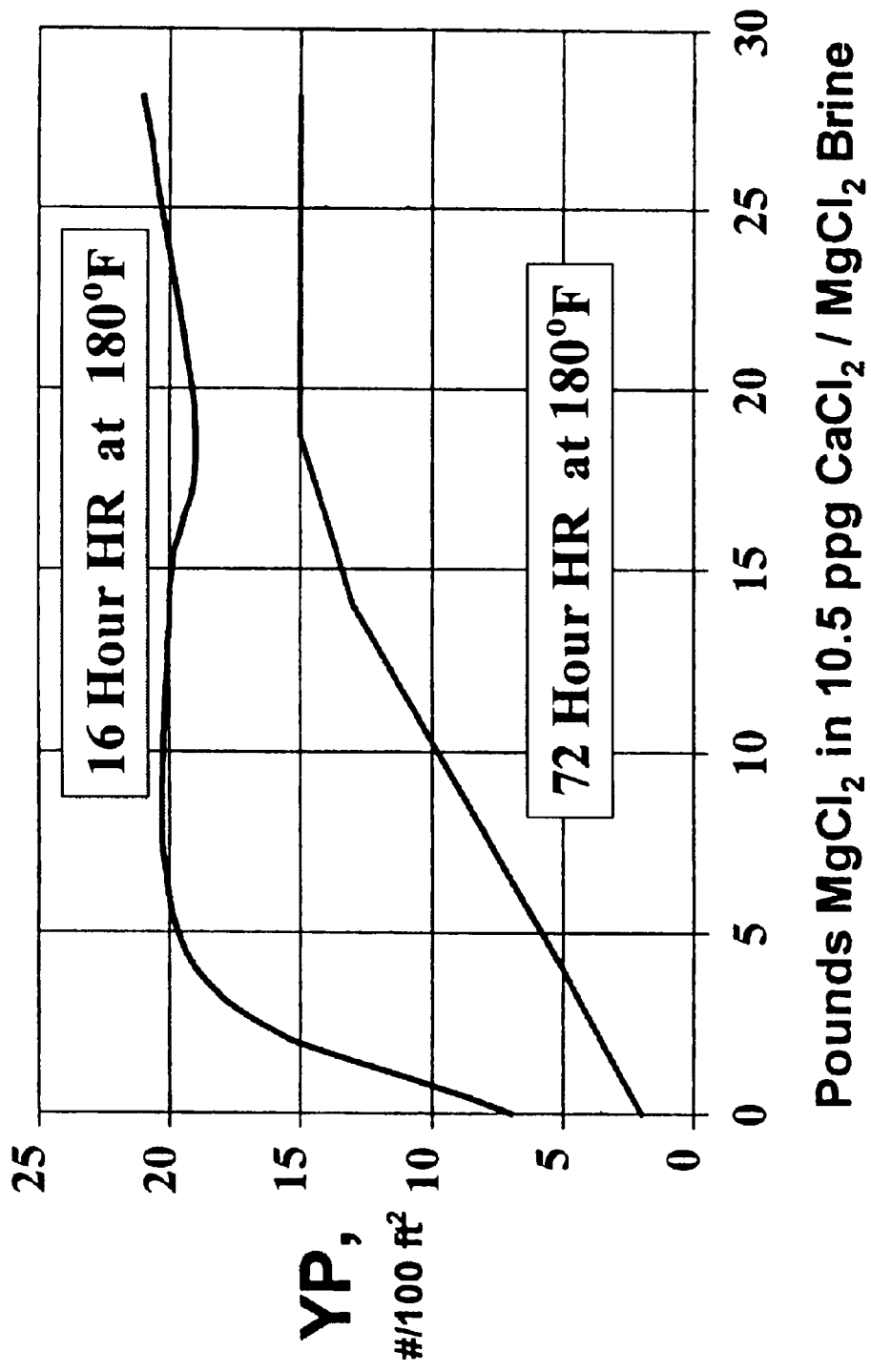
FIG. 10 is a plot of Yield Point (YP) versus pounds $MgCl_2$ in a 10.5 ppg $CaCl_2/MgCl_2$ solution.

Calcium chloride at 10.5 ppg was converted into a drilling brine by the addition of viscosifying polymers and conventional brine-based buffer at 2 pounds per barrel. Similar $MgCl_2/CaCl_2$ systems were prepared wherein some of the calcium chloride was replaced with an equivalent amount of magnesium chloride. The resulting drilling brines were then hot rolled at 180° F. for 16 and 72 hours, and their drilling properties were measured. The resulting data are shown in Table 14. The trends observed for the YP and Gel structure indicate the increased stability obtained with the mixed salt brine system compared to the pure $CaCl_2$ system. This unexpected increase in stability is amply demonstrated with the plot of YP versus pounds $MgCl_2$ in the drilling brine, shown in FIG. 10.

TABLE 14

| 10.5 ppg $CaCl_2/MgCl_2$ Drilling Brines Rheological and Gel Properties | | | | | |
|---|---|---|---|---|---|
| Pounds MgCl2 per Barrel | 0 | 4.0 | 14.1 | 18.7 | 28.1 |
| 16 Hours @ 180° F. | | | | | |
| 6/3 RPM | 1/1 | 6/4 | 7/5 | 6/5 | 8/6 |
| Gels | 0/0 | 5/5 | 5/6 | 5/5 | 7/8 |
| PV | 9 | 10 | 9 | 9 | 9 |
| YP | 7 | 19 | 20 | 19 | 21 |
| Sample Temperature, ° F. | 121 | 120 | 120 | 120 | 120 |
| 72 Hours @ 180° F. | | | | | |
| 6/3 RPM | 0/0 | 1/0 | 2/1 | 3/2 | 3/2 |
| Gels | 0/0 | 0/0 | 2/2 | 2/3 | 3/3 |
| PV | 7 | 9 | 9 | 9 | 10 |
| YP | 2 | 9 | 13 | 15 | 15 |
| Sample Temperature, ° F. | 122 | 120 | 120 | 120 | 120 |

EXAMPLE FOURTEEN $MgCl_2/CaBr_2$ and $MgBr_2/CaCl_2$

Brine based drilling fluids at 11.0 ppg were prepared from pure magnesium chloride and pure calcium bromide. Each fluid included the same amount of biopolymer and conventional brine buffer (2 ppg), and was prepared in an identical manner. Mixed brine fluids were prepared by mixing the appropriate quantities of each formulated pure salt system. The drilling brine fluids presented in Tables 15–17 were prepared as described, subjected to the aging and heat aging conditions specified, and then the rheological and gel properties were measured and recorded. Quite unexpectedly the 35% $MgCl_2$/65% $CaBr_2$ heat aged sample exhibited substantially increased values for properties across the board compared to either pure salt system. This fluid exhibited both increased gel and low end rheological properties, and the properties of this system could easily be optimized even with reduced polymer content. Even the 65% $MgCl_2$/35% $CaBr_2$ heat aged sample yielded improved properties compared to the pure $CaBr_2$ system.

TABLE 15

| 11.0 ppg $MgCl_2/CaBr_2$-based Drilling Brines Initial Rheological Properties | | | | |
|---|---|---|---|---|
| System | 100% $MgCl_2$ | 65/35% $MgCl_2/CaBr_2$ | 35/65% $MgCl_2/CaBr_2$ | 100% $CaBr_2$ |
| Rheological Properties | Room Temp | Room Temp | Room Temp | Room Temp |
| 6/3 RPM | 20/18 | 15/14 | 12/11 | 6/8 |
| Gels | 21/24 | 14/19 | 11/16 | 12/13 |
| PV | 31 | 25 | 16 | 11 |
| YP | 38 | 35 | 29 | 22 |
| Sample Temp, ° F. | 120 | 120 | 120 | 120 |

TABLE 16

11.0 ppg MgCl$_2$/CaBr$_2$-based Drilling Brines
Heat-aged Rheological Properties

| System | 100% MgCl$_2$ | 65/35% MgCl$_2$/CaBr$_2$ | 35/65% MgCl$_2$/CaBr$_2$ | 100% CaBr$_2$ |
|---|---|---|---|---|
| Rheological Properties | 16 Hours 180° F. | 16 Hours 180° F | 16 Hours 180° F | 16 Hours 180° F |
| 6/3 RPM | 17/14 | 15/12 | 39/36 | 6/4 |
| Gels | 18/21 | 14/17 | 39/44 | 5/6 |
| PV | 22 | 23 | 61 | 12 |
| YP | 32 | 37 | 43 | 20 |
| Sample Temp, ° F. | 120 | 120 | 120 | 120 |

TABLE 17

11.0 ppg MgCl$_2$/CaBr$_2$-based Drilling Brines
Heat-aged Rheological Properties

| System | 100% MgCl$_2$ | 65/35% MgCl$_2$/CaBr$_2$ | 35/65% MgCl$_2$/CaBr$_2$ | 100% CaBr$_2$ |
|---|---|---|---|---|
| Rheological Properties | 62 Hours 180° F. | 62 Hours 180° F. | 62 Hours 180° F. | 62 Hours 180° F. |
| 6/3 RPM | 19/16 | 19/16 | 33/29 | 6/4 |
| Gels | 18/20 | 16/19 | 27/29 | 6/6 |
| PV | 20 | 28 | 60 | 11 |
| YP | 36 | 42 | 30 | 21 |
| Sample Temp, ° F. | 120 | 120 | 120 | 120 |

EXAMPLE FIFTEEN

CaBr$_2$/Ca(NO$_3$)$_2$

Table 18 presents $T_m$ data for the 13.0 ppg CaBr$_2$/Ca(NO$_3$)$_2$ mixed salt system. The $T_m$ for the viscosified CaBr$_2$/Ca(NO$_3$)$_2$ mixture is surprisingly higher than that of viscosified pure Ca(NO$_3$)$_2$. The stabilization observed in the mixed salt system is also apparent from the fact that the mixture has a $T_m$ value whereas viscosified pure CaBr$_2$ does not even show a transition from which to measure a $T_m$.

TABLE 18

$T_m$ Data on Mixed Salts

| Mixed Salt System A/B | $T_{m(A/B)}$ (° F.) | $T_{m(A)}$ (° F.) | $T_{m(B)}$ (° F.) |
|---|---|---|---|
| CaBr$_2$/Ca(NO$_3$)$_2$ (50/50) | 225 | N/A | 222 |

EXAMPLE SIXTEEN

Zinc Complex Salts Mixed with Alkali Metal and Alkaline Earth Metal Salts

Table 19 presents data for three mixed salt systems: a 17.5 ppg CaZnBr$_4$/Ca$_3$(ZnBr$_5$)$_2$/Ca$_2$ZnBr$_6$/CaBr$_2$/NaBr mixed salt system (or more conventionally represented as a CaBr$_2$/ZnBr$_2$/NaBr mixed salt system), and two different 17.5 ppg CaZnBr$_4$/Ca$_3$(ZnBr$_5$)$_2$/Ca$_2$ZnBr$_6$ CaBr$_2$ mixed salt systems (or more conventionally represented as a CaBr$_2$/ZnBr$_2$ mixed salt system). These solutions were formulated initially from 19.2 ppg CaBr$_2$/ZnBr$_2$ mixed salt clear brine and 13.2 ppg CaBr$_2$; then additional solid salt containing bromide anion was added to the formulation to assure that the zinc would be complexed to a significant extent according to the following chemical reaction:

$$Zn^{2+}+U^-+V^-+W^-+X^-+Y^-+Z^- \rightleftharpoons ZnUVWXYZ^{4-} \tag{1}$$

$$Zn^{2+}+NH_3+NH_3+NH_3+NH_3+Y^-+Z^- \rightleftharpoons Zn(NH_3)_4YZ^\circ$$

$$Zn^{2+}+NH_3+NH_3+NH_3+NH_3+NH_3+Z^- \rightleftharpoons Zn(NH_3)_5YZ^+$$

where $U^-$, $V^-$, $W^-$, $X^-$, $Y^-$, and $Z^-$ are zinc complexing agents such as Cl$^-$, Br$^-$, I$^-$, OH$^-$, HCO$_2^-$, CH$_3$CO$_2^-$, C$_2$O$_4^{2-}$, HCO$_3^-$, CO$_3^{2-}$, SCN$^-$, CNO$^-$, citrate anion, etc. Robert M. Smith, Critical Stability Constants, Volume 4, p. 115, Volume 5, p. 421, and Volume 6, page 459, (New York: Plenum Press, 1989). The above list can obviously be augmented with non-ionic zinc complexing agents such as NH$_3$, H$_2$S, CH$_3$I, and various other organics, such as, for example, primary amines like isopropanolamine, secondary amines such as methyl ethanolamine, and tertiary amines, including triethanolamine. Additionally, two or more of the complexing agents, $Y^-$ and $Z^-$, may be supplied by different parts of a single moiety. For example, both the citrate and oxalate anion molecules comprise more than one carboxylate group, two of which can be attached as ligands to a given zinc ion just as easily as can each carboxylate group serve as a ligand for separate zinc ions.

Possible variants of Reaction 1 include the following:

$$Zn^{2+}+V^-+W^-+X^-+Y^-+Z^- \rightleftharpoons ZnVWXYZ^{3-} \tag{1a}$$

and $$Zn^{2+}+W^-+X^-+Y^-+Z^- \rightleftharpoons ZnWXYZ^{2-} \tag{1b}$$

In the Table 19 systems, $U^-$, $V^-$, $W^-$, $X^-$, $Y^-$, and $Z^-$ are all embodied in Reaction 1 as the bromide anion and therefore ZnUVWXYZ$^{4-}$ as the ZnBr$_6^{4-}$ anion, ZnVWXYZ$^{3-}$ as the ZnBr$_5^{3-}$ anion, ZnWXYZ$^{2-}$ as the ZnBr$_4^{2-}$ anion, etc. The reason for the need to get the bromide anion concentration high is seen in another variant of Reaction 1, given below as Reaction 2, and its further variants:

$$Zn^{2+}+H_2O+V^-+W^-+X^-+Y^-+Z^- \rightleftharpoons Zn(OH)VWXYZ^{4-}+H^+ \tag{2}$$

$$Zn^{2+}+H_2O+W^-+X^-+Y^-+Z^- \rightleftharpoons Zn(OH)WXYZ^{3-}+H^+ \tag{2a}$$

$$\text{and } Zn^{2+}+H_2O+X^-+Y^-+Z^- \rightleftharpoons Zn(OH)XYZ^{2-}+H^+ \tag{2b}$$

Since the Table 19 systems are water-based, there is therefore a tendency for the zinc to hydrolyze in accordance with Reaction 2, releasing H$^+$ and reducing the pH. At low pH, the thermal decomposition of biopolymers and common fluid loss control materials is accelerated. To avoid this undesirable consequence, consider the combination of Reactions 1 and 2, which is Reaction 3 and its variants, below:

$$Zn(OH)VWXYZ^{4-}+H^++U^- \rightleftharpoons ZnUVWXYZ^{4-}+H_2O \tag{3}$$

$$Zn(OH)WXYZ^{3-}+H^++V^- \rightleftharpoons ZnVWXYZ^{3-}+H_2O \tag{3a}$$

$$\text{and } Zn(OH)XYZ^{2-}+H^++W^- \rightleftharpoons ZnWXYZ^{2-}+H_2O \tag{3b}$$

In water-based zinc brines, accordingly, having an excess of bromide anion or any other strongly zinc-complexing agent will, through the action of LeChatelier's principle upon Reaction 3, shift the equilibrium to the right and diminish the concentration of H$^+$. Notice in Table 19 that the highest pH values are seen in the last column, where the highest level of added salt and lowest rate of thermal decomposition of biopolymers and common fluid loss control materials are also to be found. Another undesirable consequence to avoid can be seen in further variants of Reaction 2, below:

$$Zn(OH)VWXYZ^{4-}+H_2O \rightleftharpoons Zn(OH)_2WXYZ^{4-}+H^++V^- \quad (2c)$$

$$Zn(OH)WXYZ^{3-}+H_2O \rightleftharpoons Zn(OH)_2XYZ^{3-}+H^++W^- \quad (2d)$$

$$\text{and } Zn(OH)XYZ^{2-}+H_2O \rightleftharpoons Zn(OH)_2YZ^{2-}+H^++X^- \quad (2e)$$

Reactions 2c through 2e, and the like, are undesirable because they would further reduce the pH. However, having an excess of bromide anion or any other strongly zinc-complexing agent to serve in the roles of $V^-$, $W^-$, and $X^-$, in these reactions will, through the action, again, of LeChatelier's principle shift the equilibria to the left and diminish the concentration of $H^+$.

Considering the center two columns in Table 19, it is apparent that adding about 20 ppb of calcium bromide is somewhat more effective in increasing the pH and extending the durability of the formulation than adding about the same weight of NaBr.

It should be noted that while the added soluble salts were acting in the role of a pH buffer, conventional pH buffering agent was added to each drill-in fluid given in Table 19. The amount added would have been, for most other base brine systems, sufficient to keep the pH well above 5. Instead, none of the fluids in Table 19 had such a relatively high pH. This fact is a reflection of the strong pH control resulting from the base brine chemistry (Reactions 1–3 and variants) and negligible pH control induced by the presence of the 10 ppb of pH buffering agent. The point is underscored that obtaining a desirably low rate of thermal decomposition is possible especially by proper control of the pH through control of brine chemistry (especially Reactions 3 and variants), rather than through the addition of conventional pH buffering agents.

Table 20 presents data for the following eleven mixed salt clear brine systems:

A 15 ppg $ZnBr_2/CaBr_2$ mixed salt system;

A 15 ppg $CaZnBr_4/Ca_2ZnBr_6/CaBr_2$ mixed salt system;

A 15 ppg $CaZnBr_4/Ca_2ZnBr_6/CaBr_2/NaBr$ mixed salt system;

A 15 ppg $CaZnBr_4/Ca_2ZnBr_6/CaBr_2/CaCl_2$ mixed salt system;

A 15 ppg $CaZnBr_4/Ca_2ZnBr_6/CaBr_2/NaCl$ mixed salt system;

A 17 ppg $ZnBr_2/CaBr_2$ mixed salt system;

A 17 ppg $CaZnBr_4/Ca_2ZnBr_6/CaBr_2$ mixed salt system;

A 17 ppg $CaZnBr_4/Ca_2ZnBr_6/CaBr_2/NaBr$ mixed salt system;

A 17 ppg $CaZnBr_4/Ca_2ZnBr_6/CaBr_2/CaCl_2$ mixed salt system;

A 17 ppg $CaZnBr_4/Ca_2ZnBr_6/CaBr_2NaCl$ mixed salt system; and

A 17 ppg $CaZnBr_4/Ca_2ZnBr_6/CaBr_2/CaI_2$ mixed salt system.

TABLE 19

17.5 ppg Viscosified $ZnBr_2$-based Brine
2 ppb Bio-Polymer, 4 ppb Fluid Loss Control Material, & 10 ppb pH Buffer
Heat Aged 16, 40, & 96 Hours @ 180° F.

| | | | | | | | | | |
|---|---|---|---|---|---|---|---|---|---|
| NaBr added, ppb | 20.25 | | | 0 | | | 0 | | |
| $CaBr_2$ added, ppb | 0 | | | 19.5 | | | 83.9 | | |
| Base Brine System | 17.5 ppg $CaZnBr_4$/ $Ca_3(ZnBr_5)_2$/ $Ca_2ZnBr_6$/NaBr | | | 17.5 ppg $CaZnBr_4$/ $Ca_3(ZnBr_5)_2$/ $Ca_2ZnBr_6/CaBr_2$ | | | 17.5 ppg $CaZnBr_4$/ $Ca_3(ZnBr_5)_2$/ $Ca_2ZnBr_6/CaBr_2$ | | |
| Heat Aging Hours | 16 | 40 | 96 | 16 | 40 | 96 | 16 | 40 | 96 |
| PV/YP | 53/75 | 49/34 | —/—[a] | 60/82 | 60/78 | 34/9[b] | 104/80 | 118/84 | 15/82[c] |
| Gels | 23/17 | 7/5 | —/—[a] | 23/17 | 7/5 | 1/1[b] | 19/19 | 16/17 | 11/12[c] |
| pH | 2.76 | 2.57 | —[a] | 3.10 | 2.82 | 2.74[b] | 3.77 | 3.83 | 3.75[c] |
| Settling | No | No | Yes | No | No | Yes | No | No | No |
| Reference | BW3-62 | | | BW3-58 | | | RH2-6 | | |

Note [a]: The pH and rheology were not measured because the biopolymer and fluid loss control material bad very severely degraded at this point in the rolling heat-aging.
Note [b]: The biopolymer and fluid loss control material had degraded but not so severely as in the case described in Note a.
Note [c]: The biopolymer and fluid loss control material had degraded but not so severely as in the case described in Note b.

TABLE 20

15.0 ppg and 17.0 ppg $ZnBr_2/CaBr_2$- and $CaZnBr_4/Ca_2ZnBr_6$-based Clear Brines
The Effect of Added Soluble Salt on pH

| System | Base Brine Density (ppg) | Weight-up Chemical | Weight Added (ppb) | pH |
|---|---|---|---|---|
| $ZnBr_2/CaBr_2$ | 15.0 | None | 0.0 | 3.07 |
| $CaZnBr_4/Ca_2ZnBr_6/CaBr_2$ | 15.0 | $CaBr_2$ | 329.9 | 5.37 |
| $CaZnBr_4/Ca_2ZnBr_6/CaBr_2/NaBr$ | 15.0 | NaBr | 206.6 | 4.88 |
| $CaZnBr_4/Ca_2ZnB_6/CaBr_2/CaCl_2$ | 15.0 | $CaCl_2$ | 167.0 | 4.88 |
| $CaZnBr_4/Ca_2ZnBr_6/CaBr_2/NaCl$ | 15.0 | NaCl | 109.3 | 4.30 |
| $ZnBr_2/CaBr_2$ | 17.0 | None | 0.0 | 2.09 |
| $CaZnBr_4/Ca_2ZnBr_6/CaBr_2$ | 17.0 | $CaBr_2$ | 206.1 | 4.19 |
| $CaZnBr_4/Ca_2ZnBr_6/CaBr_2/NaBr$ | 17.0 | NaBr | 146.8 | 3.39 |
| $CaZnBr_4/Ca_2ZnBr_6CaBr_2/CaCl_2$ | 17.0 | $CaCl_2$ | 123.4 | 3.97 |
| $CaZnBr_4/Ca_2ZnBr_6/CaBr_2/NaCl$ | 17.0 | NaCl | 90.8 | 3.19 |
| $CaZnBr_4/Ca_2ZnBr_6/CaBr_{2/CaI2}$ | 18.2 | $CaI_2$ | 330.0 | 3.71 |

Comparisons of the various salt additives are best made on a molar basis, as is seen below. In Table 21, we have expanded the Table 20 data from 11 systems to 48, by adding data from 37 systems very closely related to the 11 from Table 20. Additionally, molar-basis data are given.

TABLE 21

15.0 ppg and 17.0 ppg $ZnBr_2/CaBr_2$- and $CaZnBr_4/Ca_2ZnBr_6$-based Clear Brines
The Effect of Added Soluble Salt on pH

| Moles Zinc | Moles $Ca_{2+}$ | Moles $Na_+$ | Moles $Cl_-$ | Moles $Br_-$ | Moles $I_-$ | MolarRatio $\left[\dfrac{TotalX}{Zn}\right]$ | pH |
|---|---|---|---|---|---|---|---|
| 1.12 | 2.30 | 0 | 0 | 3.42 | 0 | 3.04 | 3.07 |
| 0.68 | 1.40 | 1.43 | 0 | 3.51 | 0 | 5.12 | 4.42 |
| 0.68 | 1.40 | 1.91 | 0 | 3.99 | 0 | 5.83 | 4.85 |
| 0.68 | 1.40 | 2.01 | 0 | 4.09 | 0 | 5.98 | 4.88 |
| 0.29 | 3.20 | 0 | 0 | 3.49 | 0 | 11.90 | 5.07 |
| 0.29 | 3.70 | 0 | 0 | 3.99 | 0 | 13.61 | 5.27 |
| 0.29 | 3.80 | 0 | 0 | 4.09 | 0 | 13.95 | 5.33 |
| 0.29 | 3.85 | 0 | 0 | 4.14 | 0 | 14.12 | 5.35 |
| 0.29 | 3.90 | 0 | 0 | 4.19 | 0 | 14.29 | 5.37 |
| 0.82 | 3.51 | 0 | 1.84 | 2.50 | 0 | 5.28 | 4.47 |
| 0.82 | 4.41 | 0 | 2.74 | 2.50 | 0 | 6.38 | 4.80 |
| 0.82 | 4.59 | 0 | 2.92 | 2.50 | 0 | 6.60 | 4.82 |
| 0.82 | 4.68 | 0 | 3.01 | 2.50 | 0 | 6.71 | 4.88 |
| 1.00 | 2.03 | 0.84 | 0.84 | 3.03 | 0 | 3.89 | 3.53 |
| 1.00 | 2.03 | 1.70 | 1.70 | 3.03 | 0 | 4.74 | 4.29 |
| 1.00 | 2.03 | 1.87 | 1.87 | 3.03 | 0 | 4.92 | 4.30 |
| 1.46 | 2.99 | 0 | 0 | 4.45 | 0 | 3.04 | 2.09 |
| 1.23 | 2.51 | 0.75 | 0 | 4.49 | 0 | 3.65 | 2.81 |
| 1.23 | 2.51 | 1.23 | 0 | 4.98 | 0 | 4.04 | 3.30 |
| 1.23 | 2.51 | 1.33 | 0 | 5.08 | 0 | 4.12 | 3.34 |
| 1.23 | 2.51 | 1.38 | 0 | 5.12 | 0 | 4.16 | 3.39 |
| 1.23 | 2.51 | 1.43 | 0 | 5.17 | 0 | 4.20 | 3.39 |
| 1.03 | 3.46 | 0 | 0 | 4.49 | 0 | 4.37 | 3.28 |
| 1.03 | 3.96 | 0 | 0 | 4.99 | 0 | 4.85 | 3.90 |
| 1.03 | 4.06 | 0 | 0 | 5.09 | 0 | 4.95 | 4.05 |
| 1.03 | 4.11 | 0 | 0 | 5.14 | 0 | 5.00 | 4.09 |
| 1.03 | 4.i6 | 0 | 0 | 5.19 | 0 | 5.05 | 4.i9 |
| 1.30 | 3.62 | 0 | 0.96 | 3.96 | 0 | 3.78 | 2.48 |
| 1.30 | 4.52 | 0 | 1.86 | 3.96 | 0 | 4.47 | 3.56 |
| 1.30 | 4.70 | 0 | 2.04 | 3.96 | 0 | 4.61 | 3.84 |
| 1.30 | 4.79 | 0 | 2.13 | 3.96 | 0 | 4.58 | 3.97 |
| 1.40 | 2.85 | 0.44 | 0.44 | 4.24 | 0 | 3.36 | 2.37 |
| 1.40 | 2.85 | 1.30 | 1.30 | 4.24 | 0 | 3.97 | 3.01 |
| 1.40 | 2.85 | 1.47 | 1.47 | 4.24 | 0 | 4.09 | 3.17 |
| 1.40 | 2.85 | 1.55 | 1.55 | 4.24 | 0 | 4.15 | 3.19 |
| 1.46 | 2.99 | 0 | 0 | 4.45 | 0 | 3.04 | 2.09 |
| 1.46 | 3.04 | 0 | 0 | 4.45 | 0.06 | 3.08 | 2.23 |
| 1.46 | 3.10 | 0 | 0 | 4.45 | 0.11 | 3.12 | 2.31 |
| 1.46 | 3.27 | 0 | 0 | 4.45 | 0.29 | 3.24 | 2.35 |
| 1.46 | 3.45 | 0 | 0 | 4.45 | 0.46 | 3.36 | 2.53 |

TABLE 21-continued 15.0 ppg and 17.0 ppg ZnBr$_2$/CaBr$_2$- and CaZnBr$_4$/Ca$_2$ZnBr$_6$-based Clear Brines
The Effect of Added Soluble Salt on pH

| Moles Zinc | Moles Ca$_{2+}$ | Moles Na$_+$ | Moles Cl$_-$ | Moles Br$_-$ | Moles I$_-$ | MolarRatio $\left[\dfrac{\text{Total X}}{\text{Zn}}\right]$ | pH |
|---|---|---|---|---|---|---|---|
| 1.46 | 3.62 | 0 | 0 | 4.45 | 0.63 | 3.47 | 2.62 |
| 1.46 | 3.82 | 0 | 0 | 4.45 | 0.83 | 3.61 | 2.81 |
| 1.46 | 4.14 | 0 | 0 | 4.45 | 1.15 | 3.83 | 3.16 |
| 1.46 | 4.42 | 0 | 0 | 4.45 | 1.44 | 4.02 | 3.35 |
| 1.46 | 4.54 | 0 | 0 | 4.45 | 1.55 | 4.10 | 3.46 |
| 1.46 | 4.65 | 0 | 0 | 4.45 | 1.67 | 4.18 | 3.56 |
| 1.46 | 4.77 | 0 | 0 | 4.45 | 1.78 | 4.26 | 3.62 |
| 1.46 | 4.88 | 0 | 0 | 4.45 | 1.90 | 4.34 | 3.71 |

Figure 11:
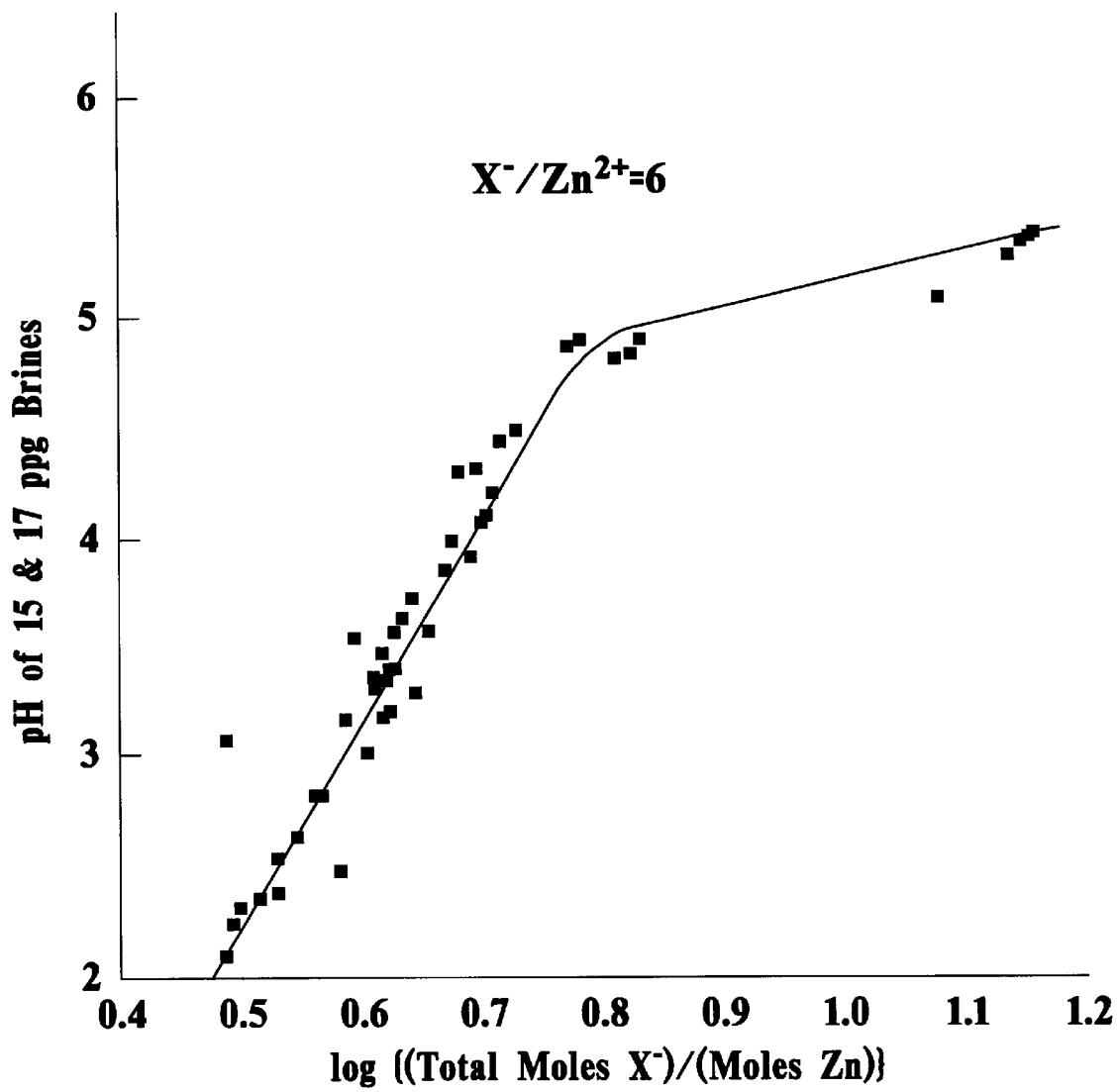
FIG. 11 is a plot of pH versus the log of the molar ratio of total halides to zinc, and is described in greater detail in Example 16.

The Table 21 data generally show a Ca/Zn molar ratio of 2 or greater, and as the molar ratio of total halides to zinc increases, the pH of the solution increases, as is desired to decrease the thermal decomposition of the biopolymers and common fluid loss control materials normally added to brines used in drilling. FIG. 11 presents the data from the last two columns in Table 21: pH is plotted versus the logarithm of the molar ratio of total halides to zinc. The logical justification of the form of the plot in FIG. 11 can be seen from considering Equation 4, which defines the function pZn–pX:

$$pZn - pX = \log\left[\dfrac{\text{Total Halides}}{Zn}\right] \quad (4)$$

Since pH is $-\log[H^+]$, a function of similar form to pZn–pX, it makes sense to plot pH as the vertical axis in FIG. 11. The horizontal axis in FIG. 11, log {(Total Moles X$^-$)/(Moles Zn)}, is actually pZn–pX. Surprisingly, over three quarters of the data cluster about the straight line shown in FIG. 11 in the vicinity ranging from pH 2 to about pH 4.5. Then the pH breaks over and appears to level off around pH 5.1 to 5.5. The transition occurs around log{X$^-$/Zn$^{2+}$}=pZn–pX=log{6}, i. e., around X$^-$/Zn$^{2+}$=6. This ratio is consistent with an interpretation that a stable zinc complex anion stoichiometry, ZnX$_6^{4-}$, has been reached in this vicinity; and low pH forms like Zn(OH)X$_5^{4-}$ have been minimized or even largely eliminated, as indicated in Reaction 5, and its variants, below:

$$Zn(OH)Br_5^{4-}+H^++Br^-\rightleftharpoons ZnBr_6^{4-}+H_2O \quad (5)$$

$$Zn(OH)Br_5^{4-}+H^++Cl^-\rightleftharpoons ZnClBr_5^{4-}+H_2O \quad (5a)$$

$$Zn(OH)Br_5^{4-}+H^++I^-\rightleftharpoons ZnBr_5I^{4-}+H_2O \quad (5b)$$

. . .

$$Zn(OH)ClBr_4^{4-}+H^++Cl^-\rightleftharpoons ZnCl_2Br_4^{4-}+H_2O \quad (5c)$$

$$Zn(OH)Br_4I^{4-}+H^++I^-\rightleftharpoons ZnBr_4I_2^{4-}+H_2O \quad (5d)$$

. . . .

$$Zn(OH)Br_4^{3-}+H^++Br^-\rightleftharpoons ZnBr_5^{3-}+H_2O \quad (5e)$$

$$Zn(OH)Br_4^{3-}+H^++Cl^-\rightleftharpoons ZnClBr_4^{3-}+H_2O \quad (5f)$$

$$Zn(OH)Br_4^{3-}+H^++I^-\rightleftharpoons ZnBr_4I^{3-}+H_2O \quad (5g)$$

. . .

$$Zn(OH)ClBr_3^{3-}+H^++Cl^-\rightleftharpoons ZnCl_2Br_3^{3-}+H_2O \quad (5h)$$

$$Zn(OH)Br_3^{3-}+H^++I^-\rightleftharpoons ZnBr_3I_2^{3-}+H_2O \quad (5i)$$

. . . .

$$Zn(OH)Br_3^{2-}+H^++Br^-\rightleftharpoons ZnBr_4^{2-}+H_2 \quad (5j)$$

$$Zn(OH)Br_3^{2-}+H^++Cl^-\rightleftharpoons ZnClBr_3^{2-}+H_2O \quad (5k)$$

$$Zn(OH)Br_3^{2-}+H^++I^-\rightleftharpoons ZnBr_3I^{2-}+H_2O \quad (5l)$$

. . .

$$Zn(OH)ClBr_2^{2-}+H^++Cl^-\rightleftharpoons ZnCl_2Br_2^{2-}+H_2O \quad (5m)$$

$$\text{and } Zn(OH)Br_2I^{2-}+H^++I^-\rightleftharpoons ZnBr_2I_2^{2-}+H_2O \quad (5n)$$

. . . .

EXAMPLE SEVENTEEN

USES OF INVENTIVE DENSE, VISCOSIFIED AQUEOUS COMPOSITIONS

Inventive compositions find advantageous use as replacements for conventional drilling, drill-in, completion, hydraulic fracturing, work-over, packer, well treating, testing, spacer, or hole abandonment fluids, these uses being well known in the art to which the invention pertains.

What is claimed is:

1. A composition comprising:

water;

a water-soluble or water-dispersible polymer capable of viscosifying an aqueous medium;

one or more cations including a member selected from the group consisting of lithium, sodium, potassium, cesium, magnesium, calcium, zinc, a zinc complex cation and mixtures thereof; and a zinc complex anion;

wherein there are present either at least two cations or at least two anions; the composition having a property selected from the group consisting of a $\tau_{50}$ of at least about 1; a $\psi_{50}$ of at most about 1; a $\Phi$ of at least about 1; a $\zeta_{50}$ of at least about 1; and a $\omega_{50}$ of at least about 1.

2. The composition of claim 1, wherein said polymer is a biopolymer.

3. The composition of claim 1, wherein said polymer is selected from the group consisting of algin; anionic cellulose; anionic polysaccharide; cationic polysaccharide; carboxymethyl cellulose; carboxymethyl hydroxyethyl cellulose; gellan gum; guar gum; gum ghatti; gum karaya; gum tragacanth; gum arabic; gum acacia; locust bean gum; methacrylic acid polymer; polyamine; polyanionic cellulose; iota, lambda or kappa sulfated polysaccharides; polysaccharides modified by i) cross-linking, ii) hydroxyethylation, iii) hydroxypropylation, iv) carboxymethyl-hydroxyethylation, v) carboxymethyl-hydroxypropylation, vi) carboxymethylation, or vii) carboxylation; rhamsan gum; vinyl compound polymer; wellan gum; glycol-compatible wellan gum; xanthan; xanthan gum; and mixtures of said polymers.

4. The composition of claim 1, wherein the composition comprises from about 0.01 to about 45.0 percent polymer by weight; from about 10.0 to about 90.0 percent water by weight; from about 0.05 to about 85.0 weight percent of a first salt; and from about 0.05 to about 85.0 weight percent of a second salt.

5. The composition of claim 1, wherein the composition comprises from about 0.5 to about 10 percent polymer by weight; from about 10.0 to about 90.0 percent water by weight; from about 2 to about 80 weight percent of a first salt; and from about 2 to about 40 weight percent of a second salt.

6. The composition of claim 1, wherein at least one of said cations is held as a complex having cationic, neutral, or anionic form.

7. The composition of claim 1, further comprising a chloride anion and a bromide anion.

8. The composition of claim 1, comprising a first cation having a +2 charge; a second cation having a +2 charge; and a third cation having a +1 charge.

9. The composition of claim 1, comprising a first cation having a +2 charge; a second cation which is held as a complex having cationic, neutral, or anionic form; and a third cation having a +1 charge.

10. The composition of claim 1, comprising calcium cations, and further comprising chloride anions and bromide anions.

11. The composition of claim 10, wherein the chloride to bromide ratio is from about 20/80 to about 80/20.

12. The composition of claim 10, wherein the chloride to bromide ratio is from about 30/70 to about 60/40.

13. The composition of claim 1, comprising calcium cations and zinc cations.

14. The composition of claim 1, comprising sodium cations, calcium cations and zinc cations.

15. The composition of claim 1, wherein the zinc complex anion comprises a zinc cation having complexed therewith a plurality of complexing agents selected from the group consisting of chloride, bromide, iodide, formate, acetate, citrate, oxalate, thiocyanate, cyanate, hydroxide, carbonate, bicarbonate, ammonia and amines.

16. The composition of claim 15, wherein the zinc complexing agent is bromide.

17. The composition of claim 1, wherein the composition comprises a cation selected from the group consisting of a calcium cation, a zinc cation, a potassium cation and a sodium cation.

18. The composition of claim 1, wherein said polymer is selected from the group consisting of xanthan and xanthan gum.

19. A method for providing a stably viscosified composition comprising:

providing an aqueous solution comprising water having dissolved therein a first salt and a second salt, wherein the solution has a density of at least about 9.5 pounds per gallon;

mixing a water-soluble or water-dispersible polymer into the solution to yield a viscosified composition; and maintaining a ratio of first salt to second salt within a range whereby there is maintained in the viscosified composition a property selected from the group consisting of a $\tau_{50}$ of at least about 1; a $\psi_{50}$ of at most about 1; a $\Phi$ of at least about 1; a $\zeta_{50}$ of at least about 1; and a $\omega_{50}$ of at least about 1.

20. The method of claim 19, wherein the solution has a density of at least about 10 pounds per gallon.

21. The method of claim 19, wherein the solution has a density of at least about 11.5 pounds per gallon.

22. The method according to claim 19, wherein the polymer is a biopolymer.

23. The method according to claim 19, wherein the polymer is selected from the group consisting of xanthan and xanthan gum.

24. The method according to claim 19, wherein the polymer is selected from the group consisting of algin; anionic cellulose; anionic polysaccharide; cationic polysaccharide; carboxymethyl cellulose; carboxymethyl hydroxyethyl cellulose; gellan gum; guar gum; gum ghatti; gum karaya; gum tragacanth; gum arabic; gum acacia; locust bean gum; methacrylic acid polymer; polyamine; polyanionic cellulose; iota, lambda or kappa sulfated polysaccharides; polysaccharides modified by i) cross-linking, ii) hydroxyethylation, iii) hydroxypropylation, iv) carboxymethyl-hydroxyethylation, v) carboxymethyl-hydroxypropylation, vi) carboxymethylation, or vii) carboxylation; rhamsan gum; vinyl compound polymer; wellan gum; glycol-compatible wellan gum; xanthan; xanthan gum; and mixtures thereof.

25. The method according to claim 19, wherein each of the first and second salts comprises a cation selected from the group consisting of lithium, sodium, potassium, cesium, magnesium, calcium, zinc and mixtures thereof; and an anion selected from the group consisting of chloride, bromide, iodide, formate, nitrate, acetate, cyanate, thiocyanate, a zinc complex anion and mixtures thereof.

26. The method according to claim 25, wherein at least one of the cations is held as a complex having cationic, neutral or anionic form.

27. The method according to claim 25, comprising chloride anions and bromide anions.

28. The method according to claim 27, further comprising calcium cations.

29. The method according to claim 27, further comprising sodium cations.

30. The method according to claim 27, wherein the chloride to bromide ratio is from about 20:80 to about 80:20.

31. The method according to claim 27, wherein the chloride to bromide ratio is from about 30:70 to about 60:40.

32. The method according to claim 25, comprising sodium cations, calcium cations and bromide anions.

33. The method according to claim 25, comprising sodium cations, calcium cations and chloride anions.

34. The method according to claim 19, wherein the viscosified composition comprises from about 0.01 to about 45.0 percent polymer by weight, from about 10.0 to about 90.0 percent water by weight; from about 0.05 to about 85.0 weight percent of the first salt; and from about 0.05 to about 85.0 weight percent of the second salt.

35. The method according to claim 19, wherein the viscosified composition comprises from about 0.5 to about 10.0 percent polymer by weight; from about 10.0 to about 90.0 percent water by weight; from about 2 to about 80 weight percent of the first salt; and from about 2 to about 40 weight percent of the second salt.

* * * * *